US012562873B2

(12) United States Patent
Kim et al.

(10) Patent No.: US 12,562,873 B2
(45) Date of Patent: Feb. 24, 2026

(54) DOWNLINK SHARED CHANNEL IN WIRELESS COMMUNICATION SYSTEM, AND DEVICE THEREFOR

(71) Applicant: LG ELECTRONICS INC., Seoul (KR)

(72) Inventors: Jaehyung Kim, Seoul (KR); Suckchel Yang, Seoul (KR); Seunggye Hwang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 18/030,216

(22) PCT Filed: Oct. 15, 2021

(86) PCT No.: PCT/KR2021/014319
§ 371 (c)(1),
(2) Date: Apr. 4, 2023

(87) PCT Pub. No.: WO2022/080922
PCT Pub. Date: Apr. 21, 2022

(65) Prior Publication Data
US 2024/0007255 A1      Jan. 4, 2024

(30) Foreign Application Priority Data

Oct. 15, 2020      (KR) ........................ 10-2020-0133413

(51) Int. Cl.
*H04L 5/00*          (2006.01)
*H04W 56/00*          (2009.01)
(Continued)

(52) U.S. Cl.
CPC ....... *H04L 5/0053* (2013.01); *H04W 72/0446* (2013.01); *H04W 72/23* (2023.01)

(58) Field of Classification Search
None
See application file for complete search history.

(56) References Cited

U.S. PATENT DOCUMENTS 11,516,061 B2 * 11/2022 Si ........................... H04L 27/266
12,284,619 B2 * 4/2025 Jiang ................... H04W 56/001
(Continued)

FOREIGN PATENT DOCUMENTS

WO          2020/041421 A1      2/2020

OTHER PUBLICATIONS

R1-2004421, 3GPP TSG RAN WG1 #101, e-Meeting, May 25-Jun. 5, 2020, Source: NTT Docomo, Inc., Title: Potential UE complexity reduction features for RedCap, Agenda Item: 8.3.1, Document for: Discussion and Decision (5 pages).
(Continued)

*Primary Examiner* — Duc T Duong
(74) *Attorney, Agent, or Firm* — BRYAN CAVE LEIGHTON PAISNER LLP

(57)          ABSTRACT

Proposed are a method for transmitting or receiving a physical downlink shared channel in a wireless communication system, and a device therefor. The method performed by a terminal may comprise the steps of: receiving an SS/PBCH block from a base station; on the basis of at least one of the frequency location of the SS/PBCH block and/or the frequency location of CORESET #0, determining a bandwidth for CORESET #0, receiving a PDCCH from the base station on CORESET #0 on the bandwidth; and receiving a PDSCH including system information on the basis of the PDCCH.

11 Claims, 18 Drawing Sheets

(51) Int. Cl.
  H04W 72/0446       (2023.01)
  H04W 72/23          (2023.01)

(56)               References Cited

U.S. PATENT DOCUMENTS

| | | | | |
|---|---|---|---|---|
| 2020/0084739 | A1* | 3/2020 | Si | H04W 72/0453 |
| 2021/0007066 | A1* | 1/2021 | Lin | H04L 5/0053 |
| 2021/0067298 | A1* | 3/2021 | Si | H04L 5/0048 |
| 2021/0127283 | A1* | 4/2021 | Si | H04W 24/08 |
| 2021/0235419 | A1* | 7/2021 | Si | H04W 16/14 |
| 2021/0352466 | A1* | 11/2021 | Hu | H04W 56/001 |
| 2023/0072513 | A1* | 3/2023 | Fang | H04L 5/0044 |
| 2023/0179374 | A1* | 6/2023 | Xu | H04L 5/0053 |
| | | | | 370/329 |
| 2023/0188261 | A1* | 6/2023 | Awadin | H04L 1/1864 |
| | | | | 370/329 |
| 2023/0209542 | A1* | 6/2023 | Wang | H04L 5/0053 |
| | | | | 370/329 |
| 2025/0098001 | A1* | 3/2025 | Hu | H04W 76/11 |

OTHER PUBLICATIONS

R1-2005383, 3GPP TSG RAN WG1 #102-e, e-Meeting, Aug. 17-28, 2020, Source: vivo, Guangdong Genius, Title: Discussion on complexity reduction for Reduced Capability NR devices, Agenda Item: 8.6.1, Document for Discussion and Decision (9 pages).

R1-2006542, 3GPP TSG RAN WG1 #102-e, e-Meeting, Aug. 17-28, 2020, Agenda Item: 8.6.1, Source: Quectel, Title: On Impacts of UE Bandwidth Reduction, Document for: Discussion and Decision (4 pages).

R2-2008192, 3GPP TSG-RAN WG2 Meeting#111-e, Online, Aug. 17-28, 2020, Agenda Item: 8.12.2.2, Source: Huawei, Title: Summary of offline 110—Identification and access restriction, Document for: Discussion and Decision (19 pages).

* cited by examiner

【FIG. 1】
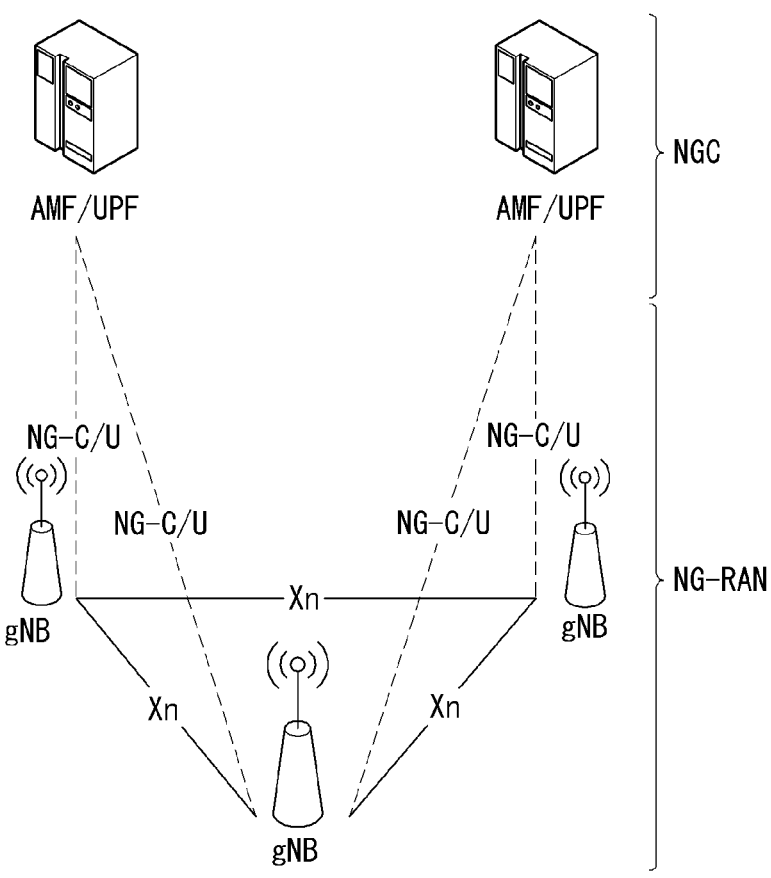
【FIG. 2】
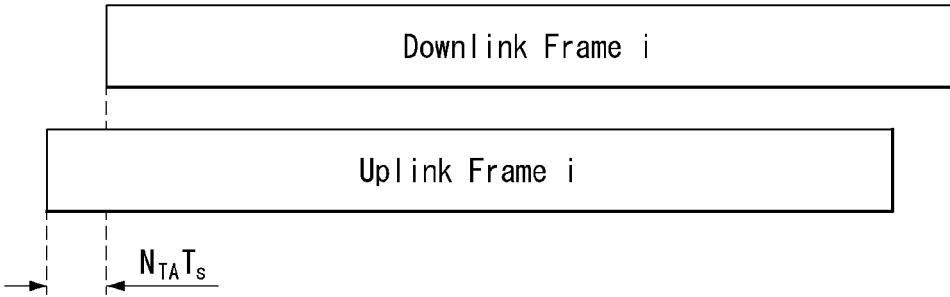

[FIG. 3]
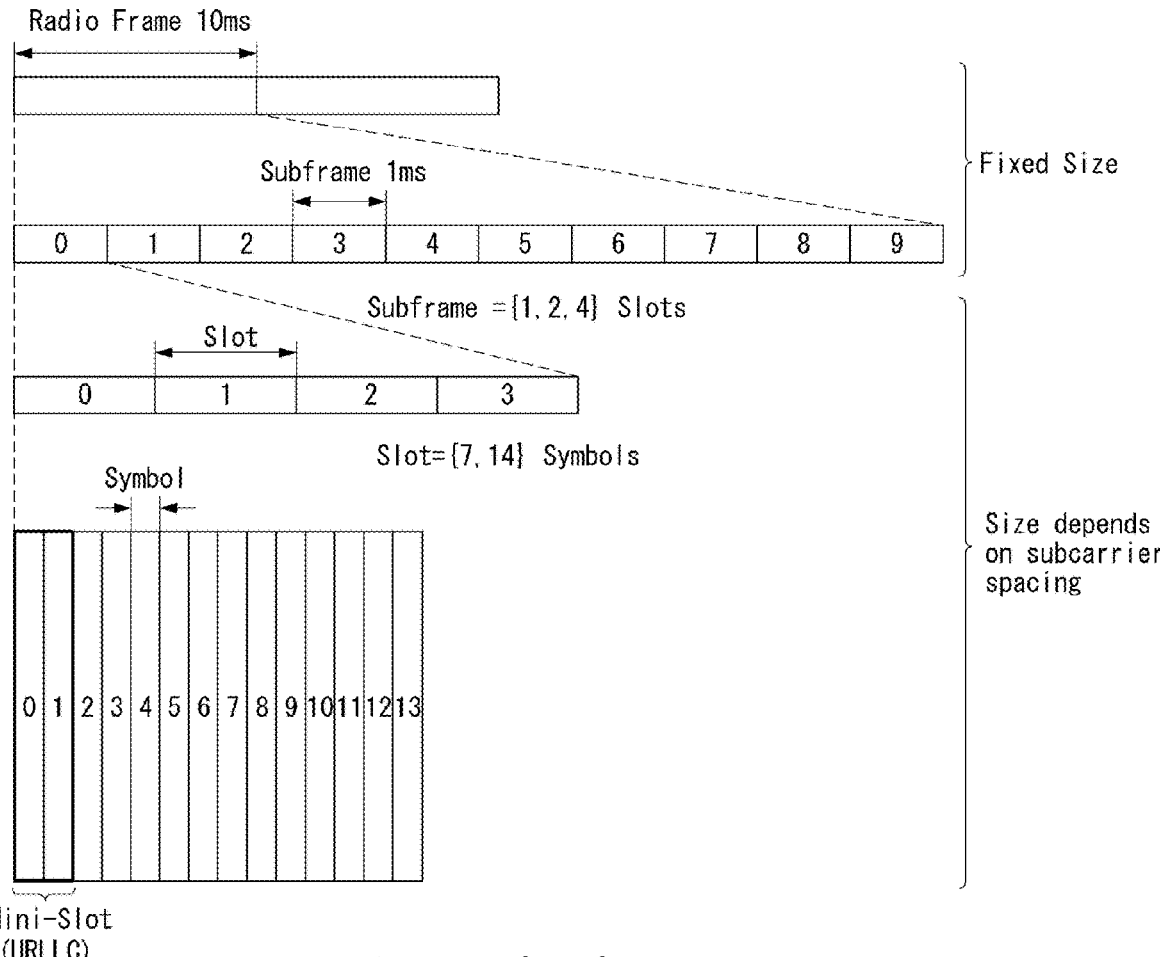

【FIG. 4】
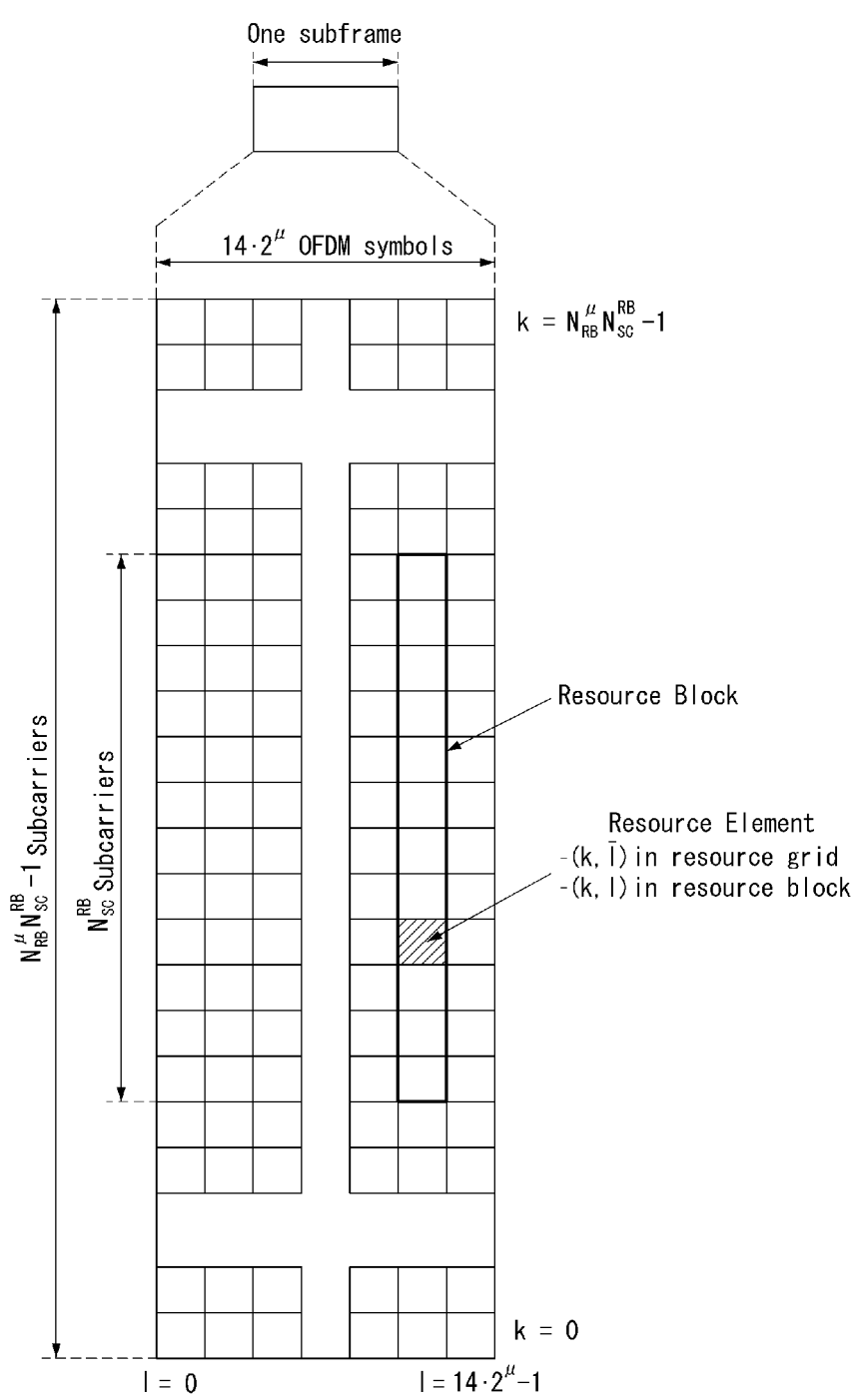

【FIG. 5】
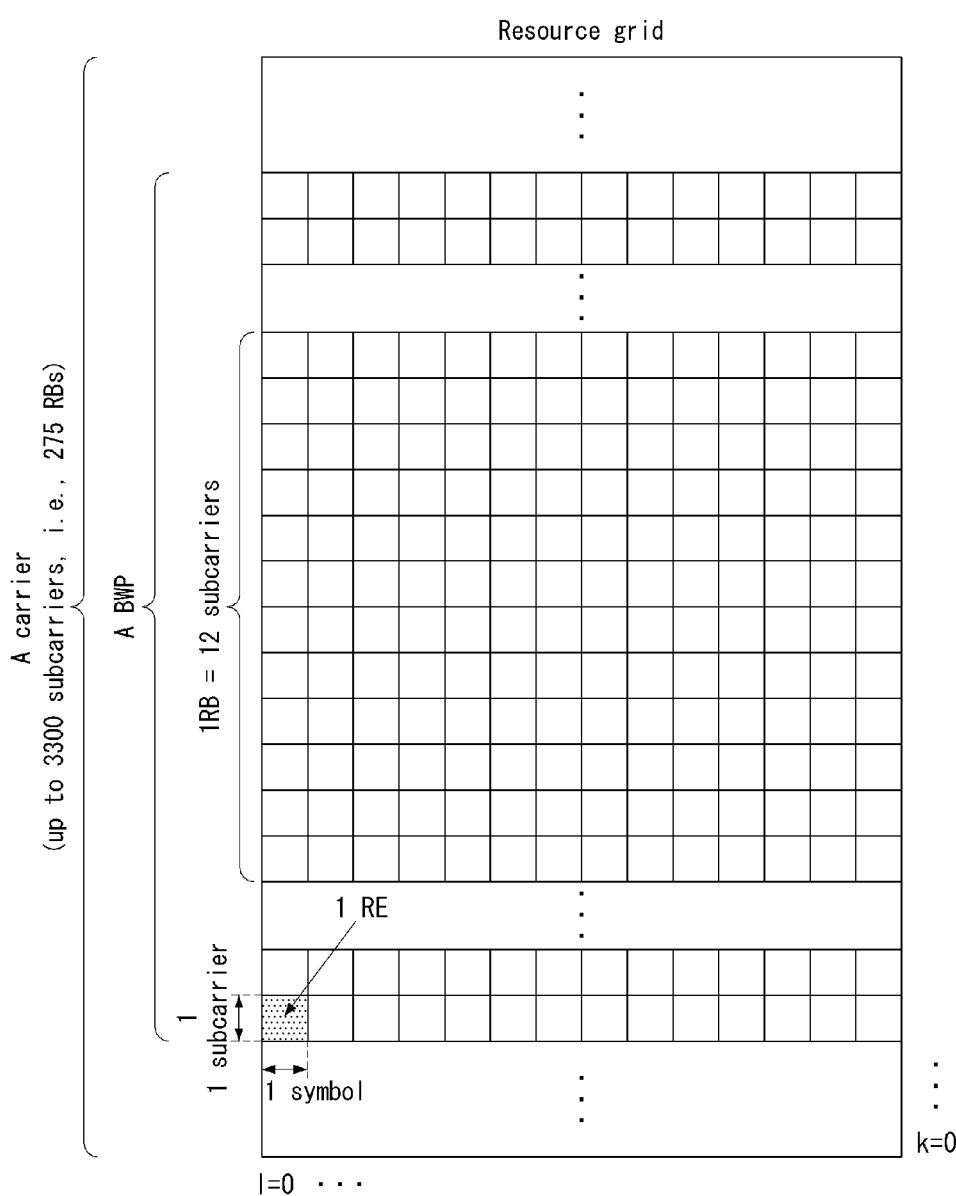

【FIG. 6】
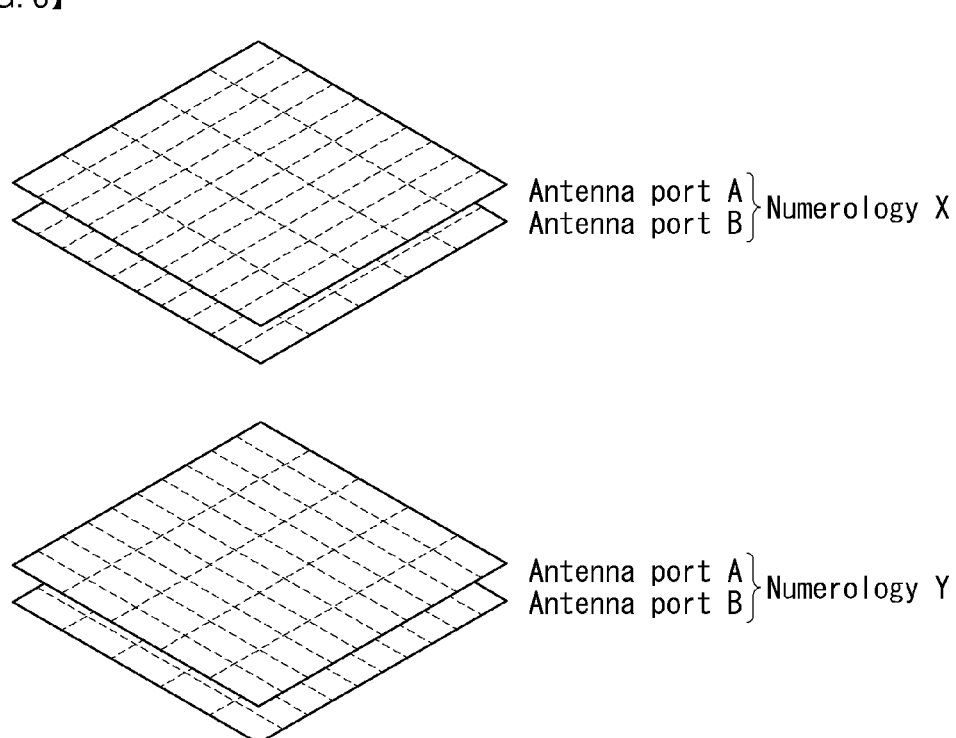

【FIG. 7】
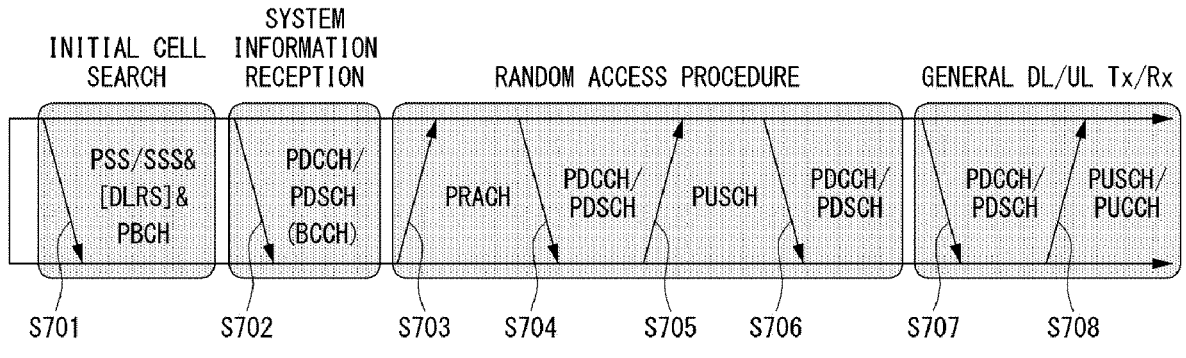
INITIAL CELL SEARCH
SYSTEM INFORMATION RECEPTION
RANDOM ACCESS PROCEDURE
GENERAL DL/UL Tx/Rx
PSS/SSS& [DLRS]& PBCH
PDCCH/ PDSCH (BCCH)
PRACH
PDCCH/ PDSCH
PUSCH
PDCCH/ PDSCH
PDCCH/ PDSCH
PUSCH/ PUCCH
S701    S702    S703    S704    S705    S706    S707    S708
· DL/UL ACK/NACK
· UE CQI/PMI RI REPORT
  USING PUSCH AND PUCCH 【FIG. 8】
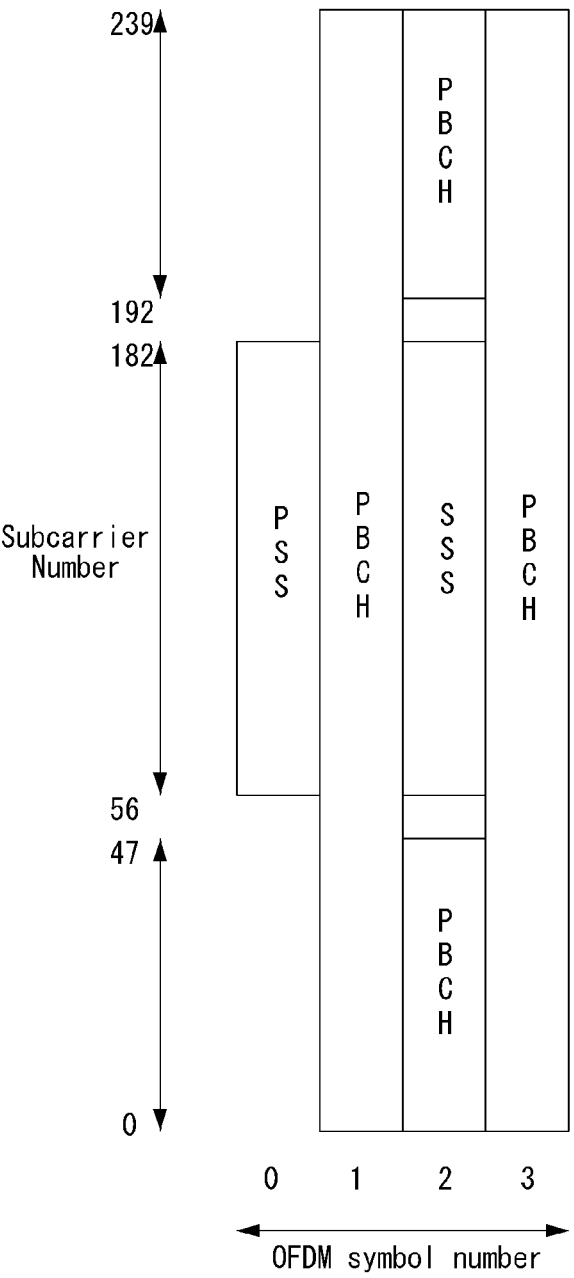

【FIG. 9】
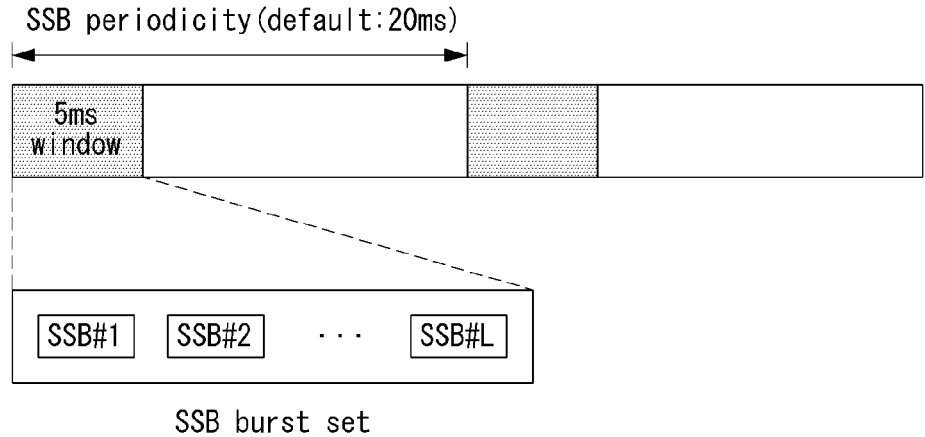

【FIG. 10】
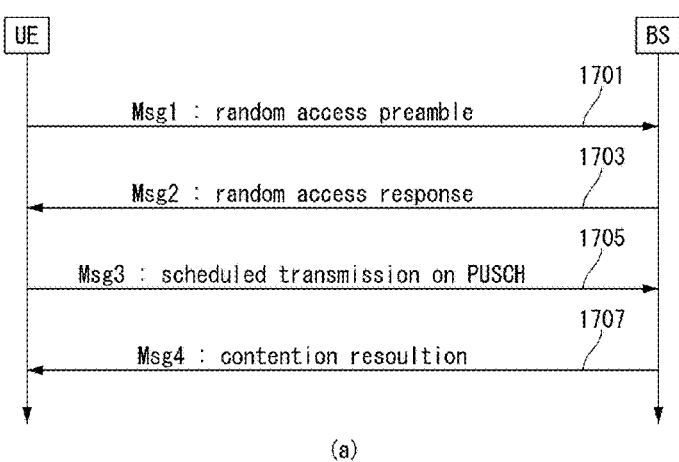
(a)
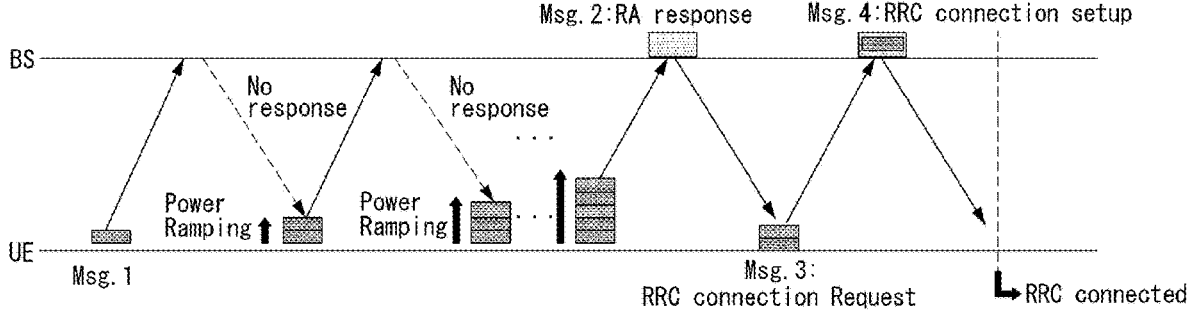
(b)

【FIG. 11】
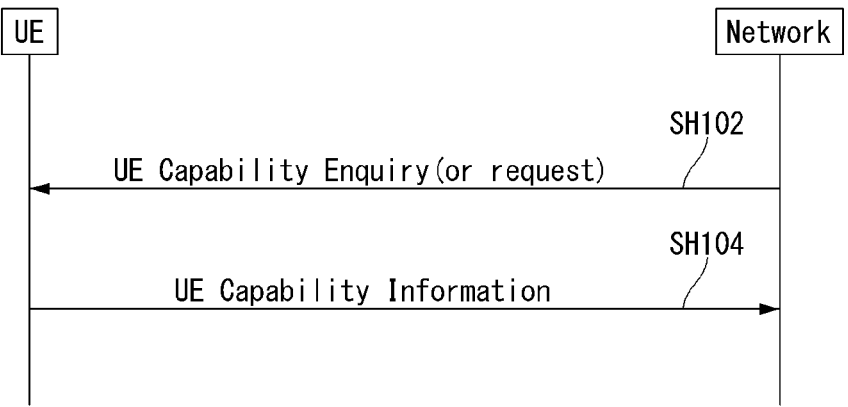
【FIG. 12】
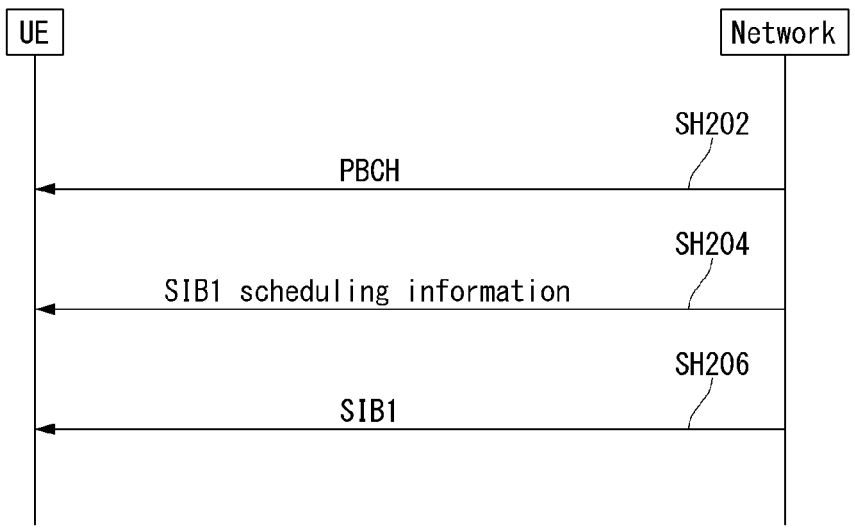

【FIG. 13】
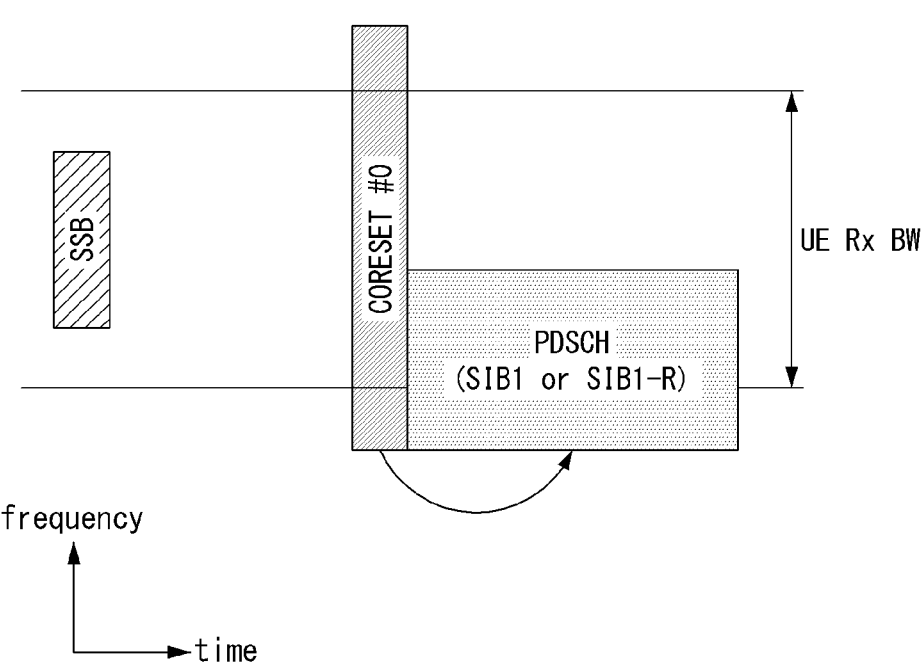

【FIG. 14】
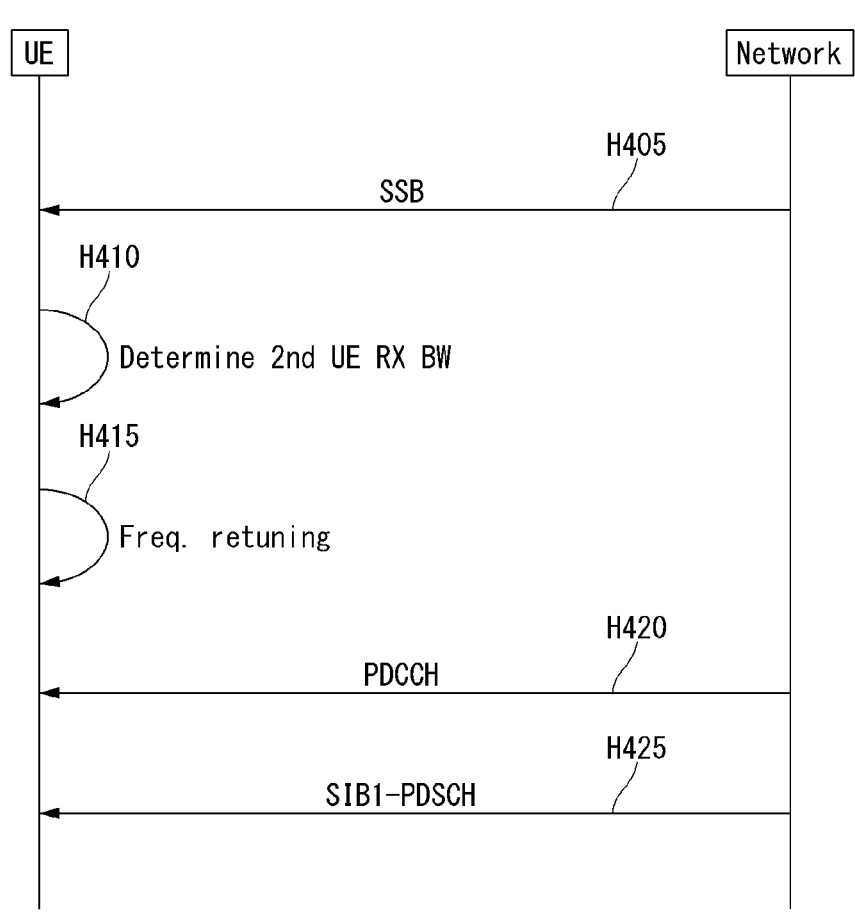

【FIG. 15】
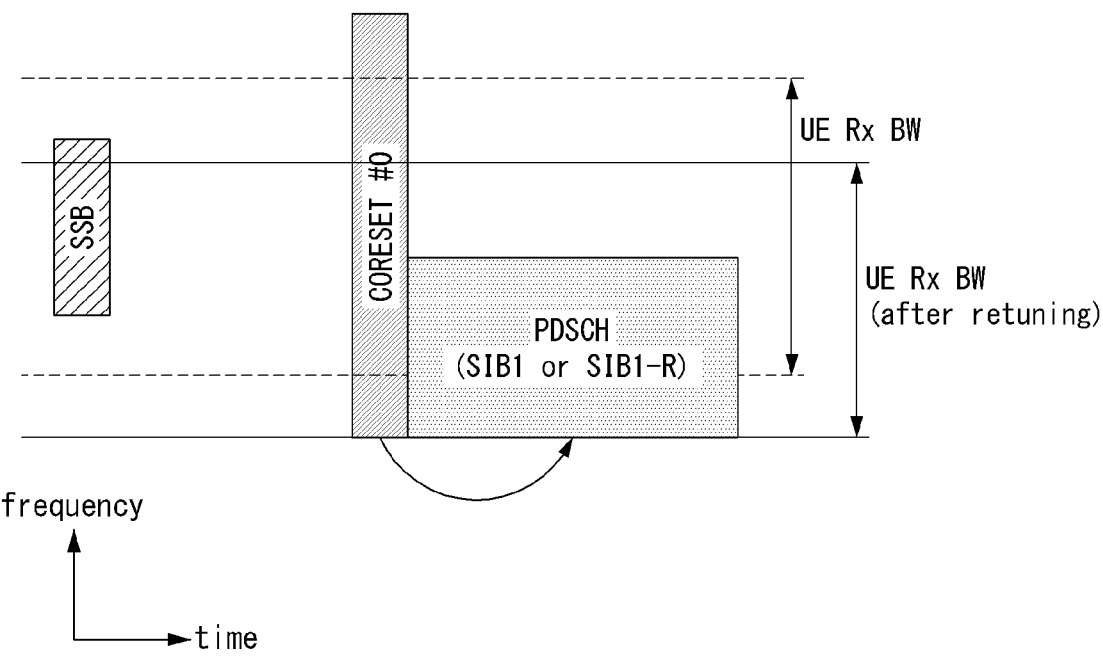
【FIG. 16】
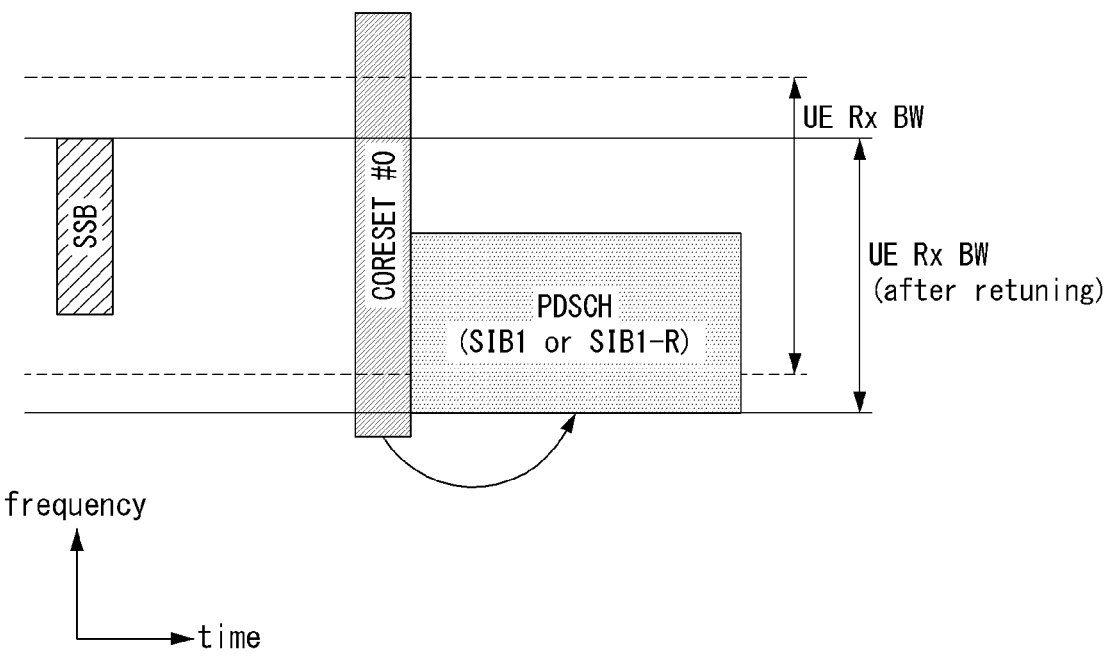

【FIG. 17】
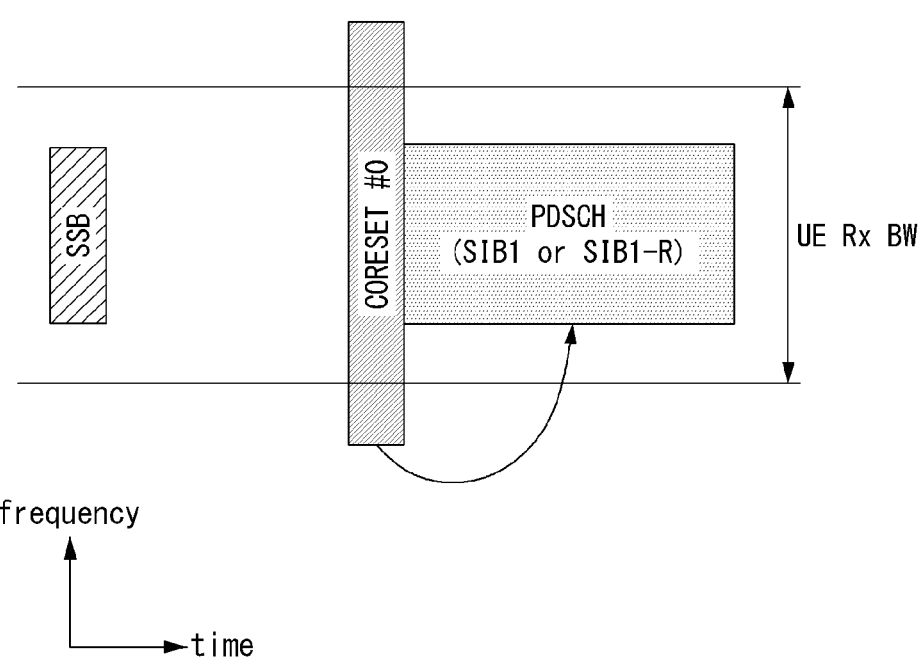
【FIG. 18】
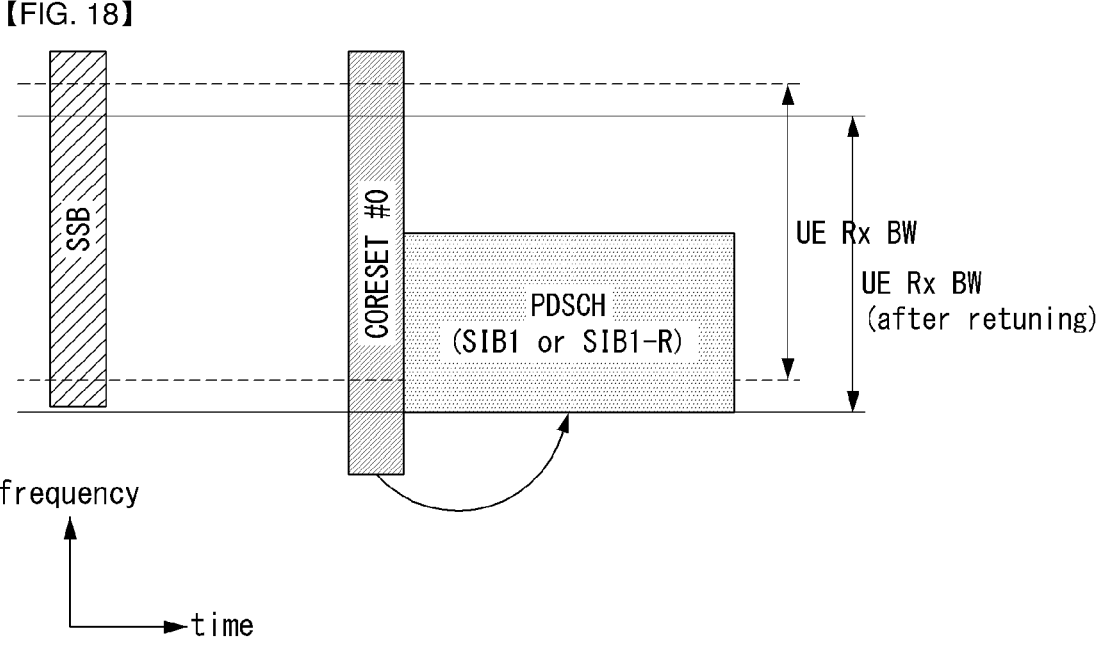

【FIG. 19】
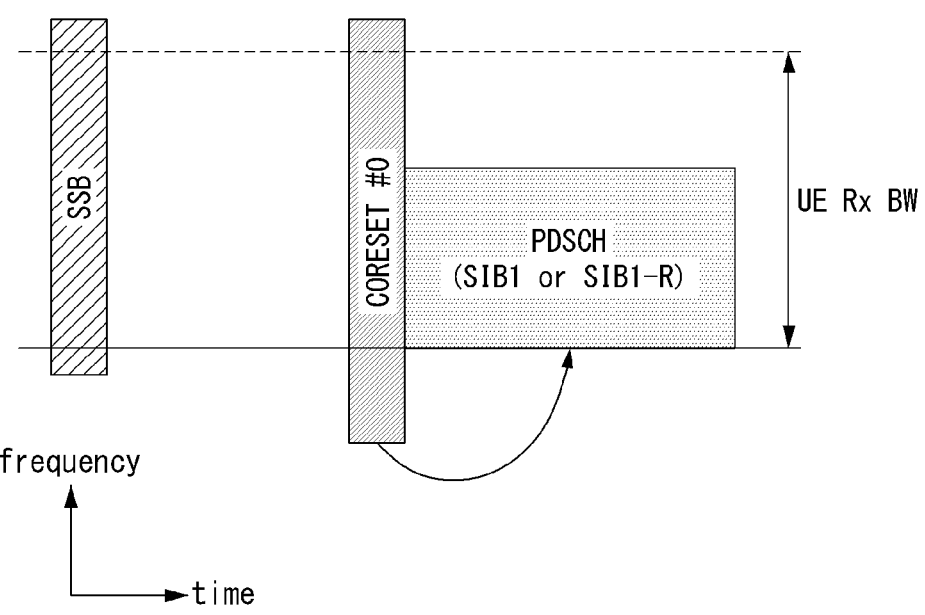
【FIG. 20】
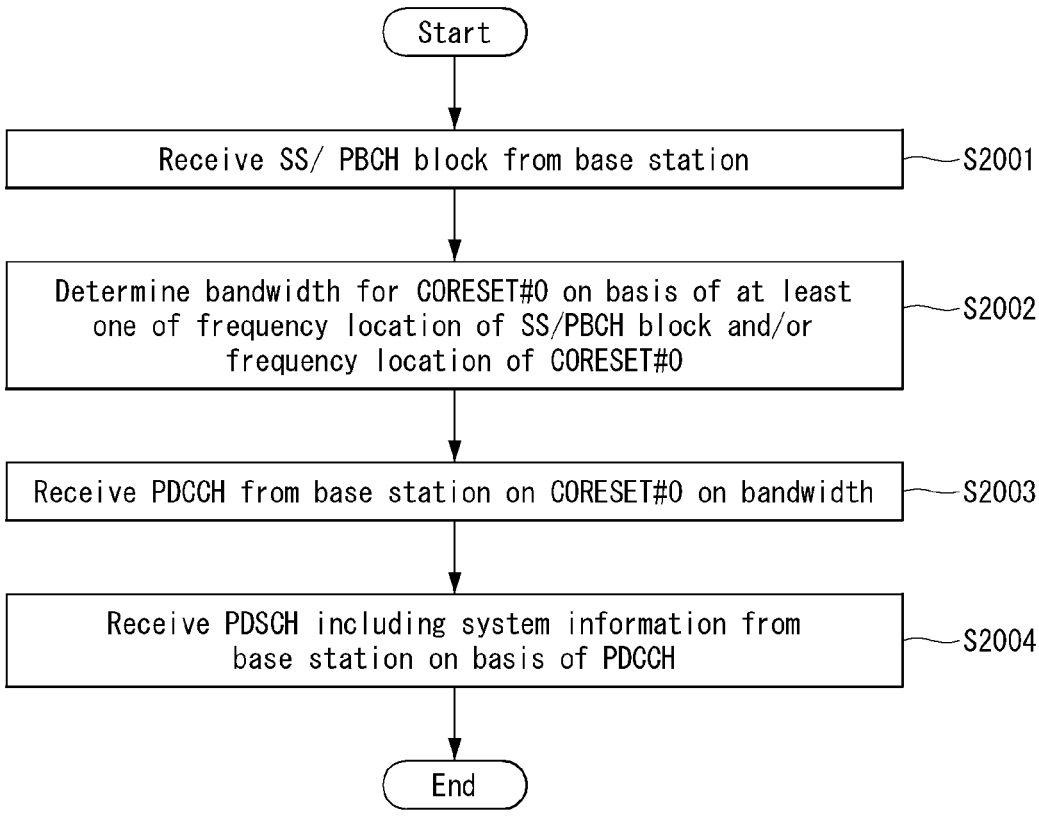

【FIG. 21】
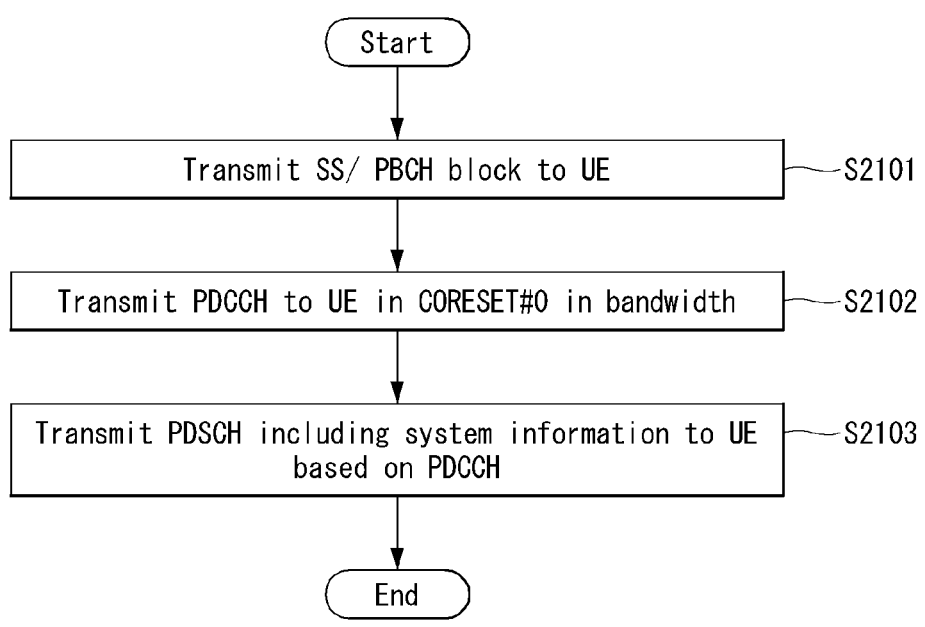
【FIG. 22】
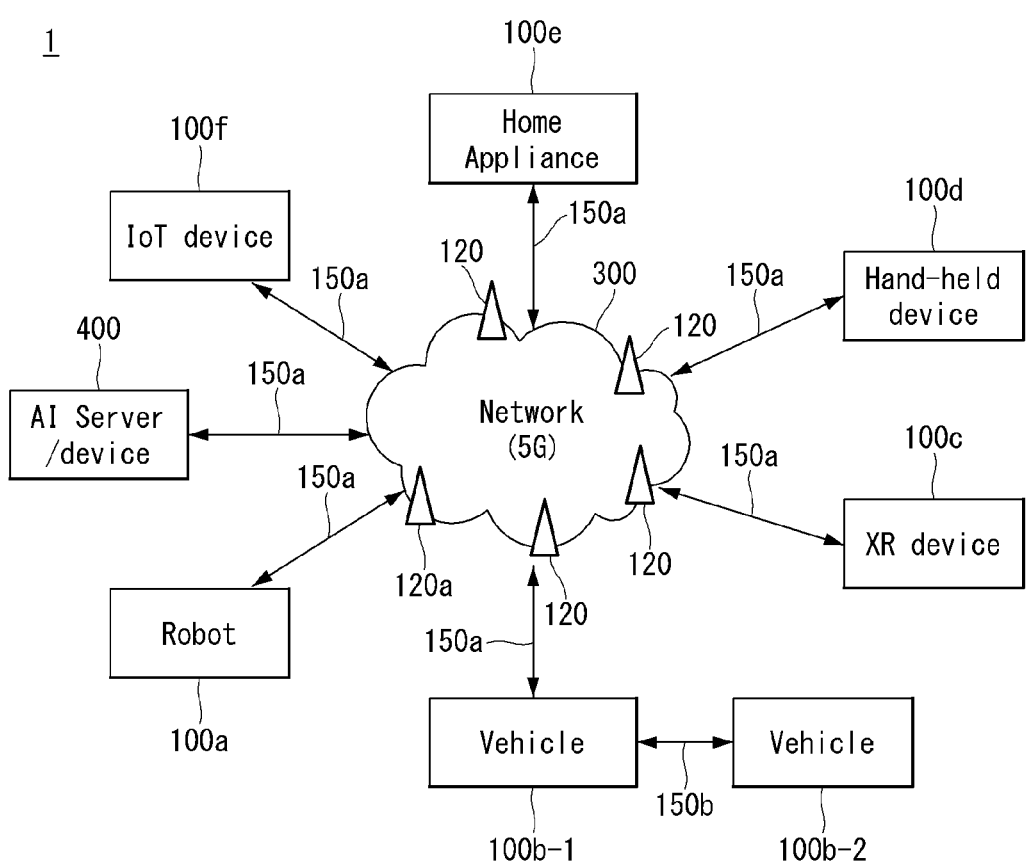

【FIG. 23】
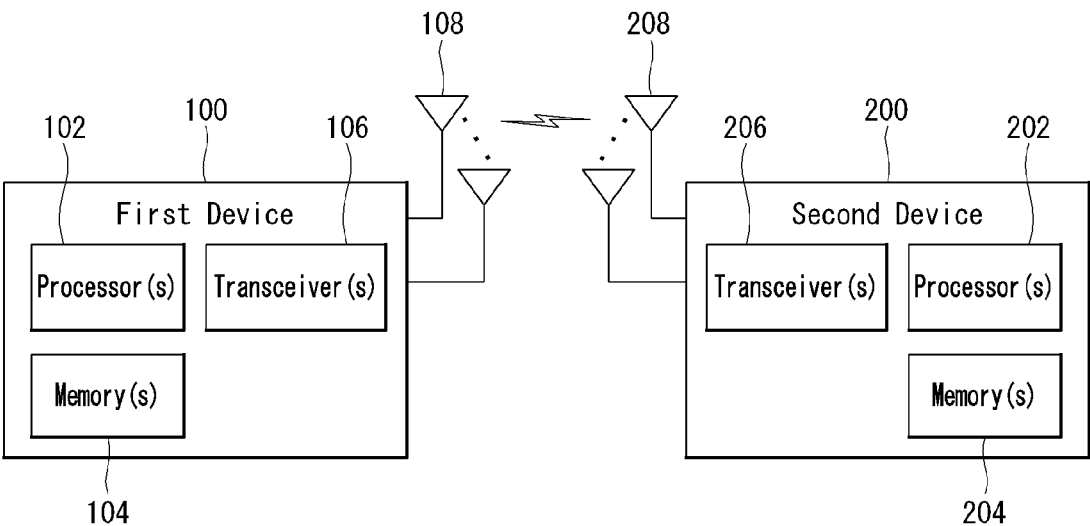
【FIG. 24】
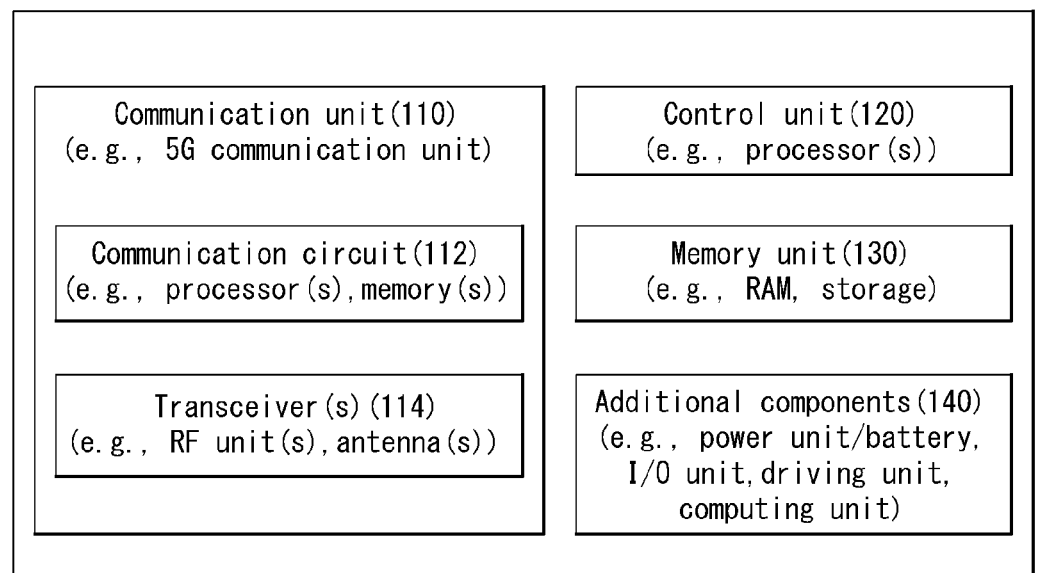

【FIG. 25】
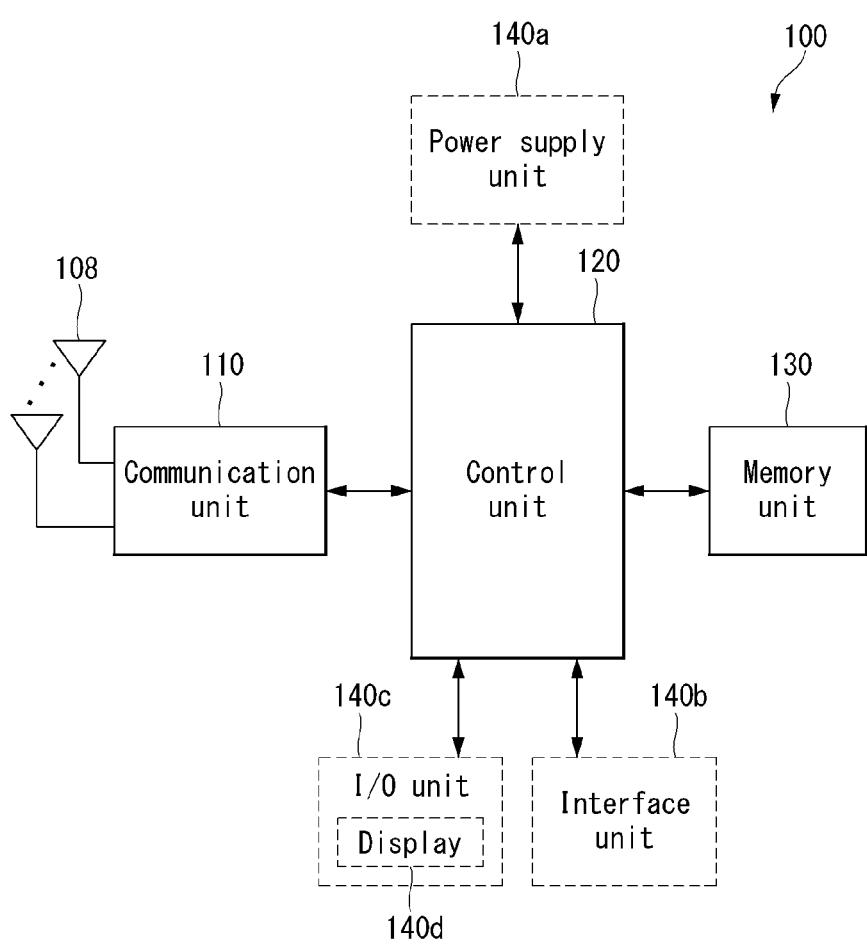

DOWNLINK SHARED CHANNEL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2021/014319, filed on Oct. 15, 2021, which claims the benefit of Korean Patent Application No. 10-2020-0133413 filed on Oct. 15, 2020 in the Korean Intellectual Property Office, the contents of which are all hereby incorporated by reference herein in their entirety.

TECHNICAL FIELD

The present disclosure relates to a wireless communication system, and more particularly, to a method for transmitting or receiving a physical downlink sharing channel (PDSCH) and an apparatus therefor.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method for transmitting or receiving system information (for example, SIB1) in a limited max UE bandwidth situation and an apparatus therefor.

The technical problems to be solved in the present disclosure are not limited to the technical problems mentioned above, and other technical problems not mentioned will be clearly understood by those skilled in the art from the following description.

Technical Solution

The present disclosure proposes a method for receiving a physical downlink shared channel (PDSCH) in a wireless communication system and an apparatus therefor. A method performed by a UE includes receiving, from a base station (BS), a synchronization signal (SS)/physical broadcast channel (PBCH) block; determining a bandwidth for CORESET #0 based on at least one of a frequency position of the SS/PBCH block and/or a frequency position of a control resource set (CORESET) #0, receiving, from the BS, a physical downlink control channel (PDCCH) in CORESET #0 in the bandwidth; and receiving, from the BS, the PDSCH including system information based on the PDCCH.

Further, in the method of the present disclosure, the UE may be reduced capability (RedCap) UE.

Further, in the method of the present disclosure, the bandwidth may be smaller than the bandwidth of CORESET #0 and determined in units of resource blocks (RBs).

Further, in the bandwidth may be determined as much as a maximum bandwidth of the UE in ascending order from a lowest resource block (RB) index of CORESET #0, or may be determined as much as the maximum bandwidth of the UE in descending order from a highest RB index of CORESET #0.

Further, the bandwidth may be determined as much as a maximum bandwidth of the UE in ascending order from a lowest resource block (RB) index of the SSB/PBCH block, or may be determined as much as the maximum bandwidth of the UE in descending order from a highest RB index of the SSB/PBCH block.

Further, in the method of the present disclosure, the bandwidth may be determined as much as a maximum bandwidth of the UE around a center frequency of CORESET #0.

Further, in the method of the present disclosure, the bandwidth may be as much as a maximum bandwidth of the UE around a center frequency of the SS/PBCH block.

Further, in the method of the present disclosure, the PDSCH may not be received based on a slot offset (K0) according to time domain resource assignment information included in the PDCCH being 0.

Further, the method of the present disclosure may further include determining a bandwidth for the PDSCH based on a slot offset (K0) according to time domain resource assignment information included in the PDCCH being not 0.

Further, in the method of the present disclosure, the PDSCH may be received in the bandwidth for the PDSCH.

Further, the method of the present disclosure, the SS/PBCH block may include information on the frequency position of CORESET #0.

Further, a user equipment (UE) configured to receive a physical downlink shared channel (PDSCH) in a wireless communication system, the UE including: at least one transceiver; at least one processor; and at least one memory operatively connected to the at least one processor and configured to store instructions for performing operations based on the instructions being executed by the at least one processor, wherein these operations may include: receiving, from a base station (BS), a synchronization signal (SS)/physical broadcast channel (PBCH) block; determining a bandwidth for CORESET #0 based on at least one of a frequency position of the SS/PBCH block and/or a frequency position of a control resource set (CORESET) #0, receiving, from the BS, a physical downlink control channel (PDCCH) in CORESET #0 in the bandwidth; and receiving, from the BS, the PDSCH including system information based on the PDCCH.

Further, in the user equipment of the present disclosure, the UE may be reduced capability (RedCap) UE.

Further, in the user equipment of the present disclosure, the bandwidth may be smaller than the bandwidth of CORESET #0 and is determined in units of resource blocks (RBs).

Further, in the user equipment of the present disclosure, the bandwidth may be determined as much as a maximum bandwidth of the UE in ascending order from a lowest resource block (RB) index of CORESET #0, or may be determined as much as the maximum bandwidth of the UE in descending order from a highest RB index of CORESET #0.

Further, in the user equipment of the present disclosure, the bandwidth may be determined as much as a maximum bandwidth of the UE in ascending order from a lowest resource block (RB) index of the SSB/PBCH block, or may be determined as much as the maximum bandwidth of the UE in descending order from a highest RB index of the SSB/PBCH block.

Further, the present disclosure proposes a method for transmitting a physical downlink shared channel (PDSCH) in a wireless communication system, and an apparatus for. A method performed by the base station may include transmitting, to a user equipment (UE), a synchronization signal (SS)/physical broadcast channel (PBCH) block, a bandwidth for control resource set (CORESET) #0 being determined based on at least one of a frequency position of the SS/PBCH block and/or a frequency position of CORESET #0; transmitting, to the UE, a physical downlink control channel (PDCCH) in CORESET #0 in the bandwidth; and transmitting, to the UE, the PDSCH including system information based on the PDCCH.

Further, a base station (BS) configured to transmit a physical downlink shared channel (PDSCH) in a wireless communication system, the BS including: at least one transceiver; at least one processor; and at least one memory operatively connected to the at least one processor and configured to store instructions for performing operations based on the instructions being executed by the at least one processor, wherein the operations may include transmitting, to a user equipment (UE), a synchronization signal (SS)/ physical broadcast channel (PBCH) block, a bandwidth for control resource set (CORESET) #0 being determined based on at least one of a frequency position of the SS/PBCH block and/or a frequency position of CORESET #0; transmitting, to the UE, a physical downlink control channel (PDCCH) in CORESET #0 in the bandwidth; and transmitting, to the UE, the PDSCH including system information to the based on the PDCCH.

Further, a processing apparatus configured to control a user equipment (UE) to receive a physical downlink shared channel (PDSCH) in a wireless communication system, the processing apparatus including: at least one processor; and at least one memory operatively connected to the at least one processor and configured to store instructions for performing operations based on the instructions being executed by the at least one processor, wherein these operations may include receiving from a base station (BS) a synchronization signal (SS)/physical broadcast channel (PBCH) block; determining a bandwidth for CORESET #0 based on at least one of a frequency position of the SS/PBCH block and/or a frequency position of a control resource set (CORESET) #0, receiving, from the BS, a physical downlink control channel (PDCCH) in CORESET #0 in the bandwidth; and receiving, from the BS, the PDSCH including system information based on the PDCCH.

A computer-readable storage medium having at least one instruction stored therein, the instruction causing at least one processor to control operations based on the instruction being executed by the at least one processor, wherein the operations may include receiving from a base station (BS) a synchronization signal (SS)/physical broadcast channel (PBCH) block; determining a bandwidth for CORESET #0 based on at least one of a frequency position of the SS/PBCH block and/or a frequency position of a control resource set (CORESET) #0, receiving, from the BS, a physical downlink control channel (PDCCH) in CORESET #0 in the bandwidth; and receiving, from the BS, a physical downlink shared channel (PDSCH) including system information based on the PDCCH.

Advantageous Effects

According to the present disclosure, there is an effect of transmitting and receiving system information (for example, SIB1) without reception delay in a limited max UE bandwidth situation.

Further, according to the present disclosure, there is an effect that a reduced capability (redacap) user equipment can transmit and receive system information with high reliability without delay.

Effects that can be obtained in the present disclosure are not limited to the effects mentioned above, and other effects not mentioned will be clearly understood by those skilled in the art from the following description.

DESCRIPTION OF DRAWINGS

The accompany drawings, which are included to provide a further understanding of the disclosure and are incorporated on and constitute a part of this disclosure illustrate embodiments of the disclosure and together with the description serve to explain the principles of the disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates a slot structure of an NR frame to which a method described in the present disclosure is applicable.

FIG. 6 illustrates examples of a resource grid per antenna port and numerology to which a method described in the present disclosure is applicable.

FIG. 7 illustrates physical channels and general signal transmission used in a 3GPP system.

FIG. 8 illustrates an SSB structure.

FIG. 9 illustrates SSB transmission.

FIG. 10 illustrates an example of a random access procedure.

FIG. 11 illustrates a flowchart of a procedure for reporting device type information to a base station.

FIG. 12 illustrates a flowchart of a method for receiving system information, to which the present disclosure can be applied.

FIG. 13 illustrates a case in which a problem occurs in SIB1-PDSCH reception in a method of the related art because a max UE bandwidth supported by the redcap UE is smaller than a CORESET #0 BW.

FIG. 14 illustrates an example of a method for receiving system information.

FIG. 15 illustrates a case of a bandwidth is received as much as a redcap UE max bandwidth from a lowest RB index of the CORESET #0 BW in method 1-1.

FIG. 16 illustrates an example of a case in which a bandwidth is received as much as a redcap UE max bandwidth in descending order of RB index from a highest RB index of the CORESET #0 BW overlapping a highest RB of an SSB in method 1-2.

FIG. 17 illustrates method 1-3.

FIG. 18 is an example in which method 1-3 is applied to another CORESET #0/SS configuration supported by an NR.

FIG. 19 illustrates an example in which a method for receiving a bandwidth as much as redcap UE max bandwidth around a center frequency of the SSB in the same CORESET #0/SS configuration as in FIG. 18 is applied.

FIG. 20 is a flowchart illustrating a method for operating a user equipment proposed in the present disclosure.

FIG. 21 is a flowchart illustrating a method for operating a base station proposed in the present disclosure.

FIG. 22 illustrates a communication system 1 applied to the present disclosure.

FIG. 23 illustrates a wireless device applied to the present disclosure.

FIG. 24 illustrates another example of the wireless device applied to the present disclosure.

FIG. 25 illustrates a mobile device applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment. Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In addition, use cases for regions spanning mMTC and eMBB, or mMTC and URLLC, are considered important.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f(\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $$n_s^\mu \in \{0, \ldots, N_{subframe}^{slots,\mu} - 1\}$$

within a subframe and are numbered in increasing order of $$n_{s,f}^\mu \in \{0, \ldots, N_{frame}^{slots,\mu} - 1\}$$

within a radio frame. One slot consists of consecutive OFDM symbols of $$N_{symb}^\mu, \text{ and } N_{symb}^\mu$$

is determined depending on a numerology used and slot configuration. The start of slots $$n_s^\mu$$

in a subframe is aligned in time with the start of OFDM symbols $$n_s^\mu N_{symb}^\beta$$

in the same subframe.

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $$N_{RB}^\mu N_{sc}^{RB}$$

subcarriers on a frequency domain, each subframe consisting of 14·2μ OFDM symbols, but the disclosure is not limited thereto.

In the NR system, a transmitted signal is described by one or more resource grids, consisting of $$N_{RB}^\mu N_{sc}^{RB}$$

subcarriers, and $$2^{\mu} N_{symb}^{(\mu)}$$

OFDM symbols, where $$N_{RB}^{\mu} \leq N_{RB}^{max,\mu} \cdot N_{RB}^{max,\mu}$$

denotes a maximum transmission bandwidth and may change not only between numerologies but also between uplink and downlink.

In this case, as illustrated in FIG. 6, one resource grid may be configured per numerology μ and antenna port p.

FIG. 5 illustrates a slot structure of an NR frame to which a method described in the present disclosure is applicable.

A slot includes a plurality of symbols in a time domain. For example, in a normal CP, one slot includes 7 symbols, and in an extended CP, one slot includes 6 symbols. A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) RBs ((P)RBs) in the frequency domain, and the BWP may correspond to one numerology (e.g., SCS, CP length, etc.). A carrier may include up to N BWPs (e.g., 5 BWPs). Data communication may be performed via an activated BWP, and only one BWP may be activated for one UE. Each element in a resource grid may be referred to as a resource element (RE), and one complex symbol may be mapped to each element.

FIG. 6 illustrates examples of a resource grid per antenna port and numerology to which a method described in the present disclosure is applicable.

Each element of the resource grid for the numerology μ and the antenna port p is called a resource element and is uniquely identified by an index pair (k, l̄), where $$k = 0, \ldots, N_{RB}^{\mu} N_{sc}^{RB} - 1$$

is an index on a frequency domain, and $$\bar{l} = 0, \ldots, 2^{\mu} N_{symb}^{(\mu)} - 1$$

refers to a location of a symbol in a subframe. The index pair (k,l) is used to refer to a resource element in a slot, where $$l = 0, \ldots, N_{synth}^{\mu} - 1.$$

The resource element (k,l̄) for the numerology μ and the antenna port p corresponds to a complex value $$a_{k,\bar{l}}^{(p,\mu)}.$$

When there is no risk for confusion or when a specific antenna port or numerology is not specified, the indices p and μ may be dropped, and as a result, the complex value may be $$a_{k,\bar{l}}^{(p)}$$

or $a_{k,\bar{l}}$.

Further, a physical resource block is defined as $$N_{sc}^{RB} = 12$$

consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2, absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $$n_{CRB}^{\mu}$$

in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $$N_{BWP,i}^{size} - 1,$$

where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $$N_{BWP,i}^{start}$$

may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may be constituted by consecutive resource blocks (RBs) on the frequency axis and may correspond to one numerology (e.g., sub-carrier spacing, CP length, slot/mini-slot duration).

Meanwhile, the eNB may configure multiple BWPs even in one CC configured to the UE. As one example, a BWP occupying a relatively small frequency domain may be configured in a PDCCH monitoring slot and a PDSCH indicated in PDCCH may be scheduled onto a BWP larger therethan. Alternatively, when UEs are concentrated on a specific BWP, some UEs may be configured to other BWPs for load balancing. Alternatively, a partial spectrum of the entire bandwidth may be excluded and both BWPs may be configured even in the same slot by considering frequency domain inter-cell interference cancellation between neighboring cells. In other words, the eNB may configure at least one DL/UL BWP to the UE associated with the wideband CC and activate at least one DL/UL BWP (by L1 signaling or MAC CE or RRC signaling) among configured DL/UL BWP(s) at a specific time and switching may be indicated to another configured DL/UL BWP (by L1 signaling or MAC CE or RRC signaling) or when a timer value is expired based on a timer, the timer value may be switched to the DL/UL BWP. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 7 illustrates physical channels and general signal transmission used in 3GPP systems. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message (Random Access Response (RAR) message) for the preamble through the PDCCH and a corresponding PDSCH. In the case of a contention based RACH, a Contention Resolution Procedure may be additionally performed (S706).

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Initial Access (IA) and Random Access (RA) Procedures

Synchronization Signal Block (SSB) Transmission and Related Operation

FIG. 8 illustrates an SSB structure. The UE may perform cell search, system information acquisition, beam alignment for initial access, DL measurement, and the like based on an SSB. The SSB is interchangeably used with a synchronization signal/physical broadcast channel (SS/PBCH) block.

Referring to FIG. 8, the SSB includes a PSS, an SSS and a PBCH. The SSB consists of four consecutive OFDM symbols, and the PSS, the PBCH, the SSS/PBCH or the PBCH is transmitted per OFDM symbol. Each of the PSS and the SSS consists of one OFDM symbol and 127 subcarriers, and the PBCH consists of 3 OFDM symbols and 576 subcarriers. The PBCH is encoded/decoded based on a polar code and is modulated/demodulated according to quadrature phase shift keying (QPSK). The PBCH in the OFDM symbol includes data resource elements (REs), to which a complex modulation value of the PBCH is mapped, and DMRS REs, to which a demodulation reference signal (DMRS) for the PBCH is mapped. There are three DMRS REs per resource block of the OFDM symbol, and there are three data REs between the DMRS REs.

Cell Search

The cell search refers to a procedure in which a UE acquires time/frequency synchronization of a cell and detects a cell identifier (ID) (e.g., physical layer cell ID (PCI)) of the cell. The PSS is used to detect a cell ID from a cell ID group, and the SSS is used to detect a cell ID group. The PBCH is used to detect an SSB (time) index and a half-frame.

The cell search procedure of the UE may be summarized as shown in Table 5 below.

TABLE 5

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | * Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) * Remaining Minimum System Information (RMSI) Control resource set (CORESET)/Search space configuration |
| 5th Step | PDCCH and PDSCH | Cell access information * RACH configuration |

There are 336 cell ID groups, and there are 3 cell IDs per cell ID group. A total of 1008 cell IDs are present. Information on a cell ID group to which a cell ID of a cell belongs is provided/acquired via the SSS of the cell, and information on the cell ID among 336 cells in the cell ID is provided/acquired via the PSS. FIG. 9 illustrates SSB transmission.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, ms, 160 ms} by a network (e.g., a BS). An SSB burst set is configured at a beginning part of the SSB periodicity. The SSB burst set includes a 5 ms time window (i.e., half-frame), and the SSB may be transmitted up to N times within the SS burst set. The maximum transmission number L of the SSB may be given as follows according to a frequency band of a carrier. One slot includes up to two SSBs.

For frequency range up to 3 GHz, L=4
For frequency range from 3 GHz to 6 GHz, L=8
For frequency range from 6 GHz to 52.6 GHz, L=64

A time position of an SSB candidate in the SS burst set may be defined based on a subscriber spacing. The time position of the SSB candidate is indexed from 0 to L−1 (SSB index) in time order within the SSB burst set (i.e., half-frame).

A plurality of SSBs may be transmitted within a frequency span of a carrier. Physical layer cell identifiers of these SSBs need not be unique, and other SSBs may have other physical layer cell identifiers.

The UE may acquire DL synchronization by detecting the SSB. The UE can identify a structure of the SSB burst set based on the detected SSB (time) index, and thus can detect a symbol/slot/half-frame boundary. The number of the frame/half-frame to which the detected SSB belongs may be identified using system frame number (SFN) information and half-frame indication information.

Specifically, the UE may acquire a 10-bit SFN for a frame to which PBCH belongs from the PBCH. Next, the UE may acquire 1-bit half-frame indication information. For example, if the UE detects a PBCH with a half-frame indication bit set to 0, the UE may determine that the SSB, to which the PBCH belongs, belongs to a first half-frame in the frame, and if the UE detects a PBCH with a half-frame indication bit set to 1, the UE may determine that the SSB, to which the PBCH belongs, belongs to a second half-frame in the frame. Finally, the UE may acquire an SSB index of the SSB, to which the PBCH belongs, based on a DMRS sequence and a PBCH payload carried by the PBCH.

System Information Acquisition

System information (SI) is divided into a master information block (MIB) and a plurality of system information blocks (SIB). The SI other than the MIB may be referred to as remaining minimum system information (RMSI). The following may be referred to for details.

The MIB includes information/parameters for monitoring PDCCH scheduling PDSCH carrying system information block1 (SIB1) and is transmitted by a BS via PBCH of SSB. For example, a UE may check whether a control resource set (CORESET) for a Type0-PDCCH common search space exists based on the MIB. The Type0-PDCCH common search space is a kind of PDCCH search space and is used to transmit a PDCCH for scheduling an SI message. If there is a Type0-PDCCH common search space, the UE may determine, based on information (e.g., pdcch-ConfigSIB1)) within the MIB, (i) a plurality of contiguous resource blocks and one or more consecutive symbols constituting the CORESET, and (ii) a PDCCH occasion (e.g., time domain location for PDCCH reception). If there is no Type0-PDCCH common search space, pdcch-ConfigSIB1 provides information for a frequency location where SSB/SIB1 exists and a frequency range where the SSB/SIB1 does not exist.

The SIB1 contains information related to availability and scheduling (e.g., transmission periodicity, SI-window size) of the remaining SIBs (hereinafter, referred to as SIBx, where x is an integer of 2 or more). For example, the SIB1 may inform whether the SIBx is periodically broadcasted or whether the SIBx is provided by a request of the UE according to an on-demand scheme. If the SIBx is provided by the on-demand scheme, the SIB1 may include information which the UE requires to perform an SI request. The SIB1 is transmitted via the PDSCH, the PDCCH for scheduling the SIB1 is transmitted through the Type0-PDCCH common search space, and the SIB1 is transmitted via the PDSCH indicated by the PDCCH.

The SIBx is included in the SI message and is transmitted via the PDSCH. Each SI message is sent within a time window (i.e., SI-window) which periodically occurs.

Channel Measurement and Rate-Matching

Up to L SSBs may be transmitted within an SSB burst set, and the number/location of SSBs which are actually transmitted may vary per BS/cell. The number/location of SSBs which are actually transmitted is used for rate-matching and measurement, and information on the actually transmitted SSBs is provided to a UE.

Random Access Procedure

A random access procedure of a UE may be summarized as shown in Table 6 and FIG. 10.

TABLE 6

| | Type of Signals | Operations/Information obtained |
|---|---|---|
| 1st step | PRACH preamble in UL | * Initial beam obtainment<br>* Random selection of RA-preamble ID |
| 2nd step | Random Access Response on DL-SCH | * Timing Advanced information<br>* RA-preamble ID<br>* Initial UL grant, Temporary C-RNTI |
| 3rd step | UL transmission on UL-SCH | * RRC connection request<br>* UE identifier |
| 4th step | Contention Resolution on DL | * Temporary C-RNTI on PDCCH for initial access<br>* C-RNTI on PDCCH for UE in RRC_CONNECTED |

The random access procedure is used for various purposes. For example, the random access procedure may be used for network initial access, handover, and UE-triggered UL data transmission. The UE may acquire UL synchronization and UL transmission resources through the random access procedure. The random access procedure is classified into a contention-based random access procedure and a contention-free random access procedure.

FIG. 10 illustrates an example of a random access procedure. In particular, FIG. 10 illustrates a contention-based random access procedure.

First, a UE may transmit a random access preamble on a PRACH as Msg1 of a random access procedure in UL (e.g., see 1701 in (a) of FIG. 10).

Random access preamble sequences having different two lengths are supported. Long sequence length 839 is applied to subcarrier spacings of 1.25 kHz and 5 kHz, and short sequence length 139 is applied to subcarrier spacings of 15 kHz, kHz, 60 kHz and 120 kHz.

Multiple preamble formats are defined by one or more RACH OFDM symbols and different cyclic prefixes (and/or guard time). RACH configuration for a cell is included in system information of the cell and is provided to the UE. The RACH configuration includes information on a subcarrier spacing of PRACH, available preambles, preamble format, and the like. The RACH configuration includes association information between SSBs and RACH (time-frequency) resources. The UE transmits a random access preamble in the RACH time-frequency resource associated with the detected or selected SSB.

A threshold of the SSB for the RACH resource association may be set by the network, and an RACH preamble is transmitted or retransmitted based on the SSB in which reference signal received power (RSRP) measured based on the SSB satisfies the threshold. For example, the UE may select one of the SSB(s) satisfying the threshold and may transmit or retransmit the RACH preamble based on the RACH resource associated with the selected SSB.

When a BS receives the random access preamble from the UE, the BS transmits a random access response (RAR) message (Msg2) to the UE (e.g., see 1703 in (a) of FIG. 10). A PDCCH that schedules a PDSCH carrying a RAR is CRC masked with a random access (RA) radio network temporary identifier (RNTI) (RA-RNTI) and is transmitted. The UE that detects the PDCCH masked with the RA-RNTI may receive a RAR from the PDSCH scheduled by DCI carried by the PDCCH. The UE checks whether the RAR includes random access response information for the preamble transmitted by the UE, i.e., Msg1. Presence or absence of random access information for the Msg1 transmitted by the UE may be determined based on presence or absence of a random access preamble ID for the preamble transmitted by the UE. If there is no response to the Msg1, the UE may retransmit the RACH preamble less than a predetermined number of times while performing power ramping, as illustrated in (b) of FIG. 10. The UE calculates PRACH transmission power for preamble retransmission based on most recent pathloss and a power ramping counter.

The random access response information includes timing advance information for UL synchronization, an UL grant, and UE temporary cell RNTI (C-RNTI). If a temporary UE receives random access response information for the UE itself on the PDSCH, the UE can know timing advance information for UL synchronization, an initial UL grant, and UE temporary cell RNTI (C-RNTI). The timing advance information is used to control uplink signal transmission timing. In order to ensure that the PUSCH/PUCCH transmission by the UE is better aligned with subframe timing at a network end, the network (e.g. BS) may measure a time difference between the PUSCH/PUCCH/SRS reception and subframes and send timing advance information based on the time difference. The UE may perform UL transmission as Msg3 of the random access procedure on a physical uplink shared channel based on the random access response information (e.g., see 1705 in (a) of FIG. 10). The Msg3 may include an RRC connection request and a UE identifier. The network may transmit Msg4 as a response to the Msg3, and the Msg4 may be handled as a contention resolution message on DL (e.g., see 1707 in (a) of FIG. 10). The UE may enter an RRC connected state by receiving the Msg4.

The contention-free random access procedure may be used or performed when the UE handovers to another cell or the BS or when the contention-free random access procedure is requested by a command of the BS. A basic process of the contention-free random access procedure is similar to the contention-based random access procedure. However, unlike the contention-based random access procedure in which the UE randomly selects a preamble to be used among a plurality of random access preambles, in the contention-free random access procedure, a preamble (hereinafter, referred to as a dedicated random access preamble) to be used by the UE is allocated by the BS to the UE. Information on the dedicated random access preamble may be included in an RRC message (e.g., a handover command) or may be provided to the UE via a PDCCH order. When the random access procedure is initiated, the UE transmits the dedicated random access preamble to the BS. When the UE receives the random access procedure from the BS, the random access procedure is completed.

As mentioned above, the UL grant in the RAR schedules PUSCH transmission to the UE. The PUSCH carrying initial UL transmission based on the UL grant in the RAR is also referred to as Msg3 PUSCH. The content of the RAR UL grant starts at an MSB and ends at a LSB, and is given in Table 7.

TABLE 7

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A TPC command is used to determine transmission power of the Msg3 PUSCH and is interpreted, for example, based on Table 8.

21

TABLE 8

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, a CSI request field in the RAR UL grant indicates whether the UE includes an aperiodic CSI report in the corresponding PUSCH transmission. A subcarrier spacing for the Msg3 PUSCH transmission is provided by an RRC parameter. The UE will transmit the PRACH and Msg3 PUSCH on the same uplink carrier of the same service serving cell. A UL BWP for Msg3 PUSCH transmission is indicated by SIB1 (SystemInformationBlock1).

Technical Terms Used in the Present Disclosure

UE: User Equipment
SSB: Synchronization Signal Block
MIB: Master Information Block
RMSI: Remaining Minimum System Information
FR1: Frequency domain with frequency range less than or equal to 1.6 GHz (e.g., 450 MHz to 6,000 MHz).
FR2: Millimeter wave (mmWave) domain with frequency range greater than or equal to 2.24 GHz (e.g., 24,250 MHz to 52,600 MHz).
BW: Bandwidth
BWP: Bandwidth Part
RNTI: Radio Network Temporary Identifier
CRC: Cyclic Redundancy Check
SIB: System Information Block
SIB1: SIB1 for NR devices=RMSI (Remaining Minimum System Information). It broadcasts information, etc. necessary for cell access of an NR UE.
CORESET (Control Resource SET): time/frequency resource in which an NR UE tries candidate PDCCH decoding.
CORESET #0: CORESET for Type0-PDCCH CSS set for NR devices (configured at MIB)
Type0-PDCCH CSS set: a search space set in which an NR UE monitors a set of PDCCH candidates for a DCI format with CRC scrambled by a SI-RNTI
MO: PDCCH Monitoring Occasion for Type0-PDCCH CSS set
SIB1-R: (additional) SIB1 for reduced capability NR devices. It may be limited when it is generated with a separate TB from SIB1 and is transmitted on a separate PDSCH.
CORESET #0-R: CORESET #0 for reduced capability NR devices
Type0-PDCCH-R CSS set: a search space set in which a RedCap UE monitors a set of PDCCH candidates for a DCI format with CRC scrambled by a SI-RNTI
MO-R: PDCCH Monitoring Occasion for Type0-PDCCH CSS set
Cell defining SSB (CD-SSB): SSB including RMSI scheduling information among NR SSBs
Non-cell defining SSB (non-CD-SSB): SSB that has been deployed on NR sync raster, but does not include RMSI scheduling information of a corresponding cell for measurement. But, the SSB may include information informing a location of cell defining SSB.
SCS: Subcarrier Spacing
SI-RNTI: System Information-Radio Network Temporary Identifier
Camp on: "Camp on" is a UE state in which the UE stays on a cell and is ready to initiate a potential dedicated service or to receive an ongoing broadcast service.
TB: Transport Block
RSA (Redcap standalone): Redcap device or cell supporting only service.
SIB1(-R)-PDSCH: PDSCH transmitting SIB1(-R)
SIB1(-R)-DCI: DCI scheduling SIB1(-R)-PDSCH. DCI format 1_0 with cyclic redundancy check (CRC) scrambled by SI-RNTI.
SIB1(-R)-PDCCH: PDCCH transmitting SIB1(-R)-DCI
FDRA: Frequency Domain Resource Allocation
TDRA: Time Domain Resource Allocation
In addition to 5G main use cases (mMTC, eMBB and URLLC), the importance/interest in the use case domain over mMTC and eMBB or mMTC and URLLC has recently increased. Hence, the need for UEs for efficiently supporting these use cases in terms of device cost, power consumption, form factor, etc. has increased.

In the present disclosure, a UE for the above purpose is called a (NR) reduced capability UE/device, or a (NR) RedCap UE/device for short. Further, distinguished from the RedCap device, a general NR UE that supports all or one or more of the 5G main use cases is called an NR (normal) UE/device or a non-redcap UE/device. The RedCap UE may be a UE that intentionally reduces some capabilities of 5G key capabilities (peak data rate, user experienced data rate, latency, mobility, connection density, energy efficiency, spectrum efficiency, and area traffic efficiency) defined in IMT-2020, in order to achieve all or part of low device cost/complexity, low power consumption, small form factor, etc.

The 5G use case domain over mMTC and eMBB or mMTC and URLLC that are target use cases of the RedCap device is called RedCap use cases for convenience of explanation in the present disclosure.

For example, the redcap use cases may be as follows.
[RedCap Use Cases]
Connected Industries
Sensors and actuators are connected to 5G networks and core
Include massive Industrial Wireless Sensor Network (IWSN) use cases and requirements
Not only URLLC services with very high requirements, but also relatively low-end services with the requirement of small device form factors with a battery life of several years
Requirements for these services are higher than Low Power Wide Area (LPWA) (i.e., LTE-M/NB-IOT) but lower than URLCC and eMBB.
Devices in such environment include e.g. pressure sensors, humidity sensors, thermometers, motion sensors, accelerometers, actuators, etc.
Smart City
The smart city vertical covers data collection and processing to more efficiently monitor and control city resources, and to provide services to city residents.
Especially, the deployment of surveillance cameras is an essential part of the smart city but also of factories and industries.
Wearables
Wearables use case includes smart watches, rings, eHealth related devices, and medical monitoring devices etc.

One characteristic for the use case is that the device is small in size.

The RedCap use cases cannot be supported by low power wireless area (LPWA) UEs (e.g., LTE-M, NB-IoT, etc.) in terms of bit rate, latency, etc. The NR UE can functionally support the RedCap use cases, but the support may be ineffective in terms of the UE manufacturing cost, form factor, battery life, etc.

The fact that a RedCap UE having characteristics such as low cost, low power, small form factor, etc. supports the use case area in the 5G network can bring an effect of reducing the manufacturing cost and maintenance cost of the UEs.

The RedCap use cases have quite diverse requirements in terms of UE complexity, target bit rate, latency, power consumption, etc. The RedCap requirements may be divided into generic requirements applied to all the RedCap use cases and use case specific requirements applied only to specific use case(s).

For example, some typical generic and use case specific requirements may be as follows.

[Redcap Requirements]

Generic Requirements

Device complexity/cost: Main motivation for the new device type is to lower the device cost and complexity as compared to high-end eMBB and URLLC devices of Rel-15/Rel-16. This is especially the case for industrial sensors.

Device size: Requirement for most use cases is that the standard enables a device design with compact form factor Deployment scenarios: System should support all FR1/FR2 bands for FDD and TDD Use Case Specific Requirements Industrial Wireless Sensors reference bit rate: <2 Mbps (potentially UL heavy traffic)

end-to-end latency: <100 ms; ~5-10 ms for safety related sensors battery: at least few years communication service availability: 99.99% stationary

Video Surveillance

Reference bit rate: <2-4 Mbps for economic video; ~7.5-25 Mbps for high-end video (UL heavy traffic)

Latency: <500 ms

Reliability: 99%-99.9%.

Wearables

Reference bit rate: 10-50 Mbps in DL and >=5 Mbps in UL for smart wearable application Peak bit rate: 150 Mbps in DL and 50 Mbps in UL Battery: multiple days (up to 1-2 weeks)

An example of schematic use case specific requirements for the three typical RedCap use cases is the same as Table 9.

TABLE 9

| Use cases | Com-plexity | Form factor | Bit rate (Mbps) | Latency (ms) | Mobility | Battery |
|---|---|---|---|---|---|---|
| Industrial Wireless Sensor | Very low | Very small | A few | Tens of/ A few [1)] | Stationary | Years |
| Video Surveillance | Low [2)] | Small | A few/ Tens of | Hundreds of | Stationary | |
| Wearables | Low [2)] | Small | Tens of | | Mobile | Weeks |

Safety Related Sensors

Low Complexity Compared to the Normal NR Device

The RedCap requirements can be satisfied by (combination of) various features provided by the UE and the BS. The followings are examples of features and sub-features supported by the UE/BS for satisfying the RedCap requirements.

[Redcap UE FEATURES]

Complexity Reduction Features

Reduced number of UE RX/TX antennas

UE Bandwidth reduction

Half-Duplex-FDD

Relaxed UE processing time

Relaxed UE processing capability

Power Saving

Reduced PDCCH monitoring by smaller numbers of BDs and CCE limits

Extended DRX for RRC Inactive and/or Idle

RRM relaxation for stationary devices

Coverage recovery/enhancement

The RedCap use cases may define and support one or multiple UEs. The present disclosure considers all the following two cases (Case A/Case B).

Case A: Support the RedCap use cases in a single device type case

Case B: Support the RedCap use cases in multiple device type case

In the Case A, a RedCap UE may be a UE satisfying all the RedCap requirements (i.e., the generic requirements and the use case specific requirements), and/or may be a UE supporting all the RedCap use cases. In this case, because the UE shall simultaneously satisfy various requirements, there may be a factor increasing the cost due to an increase in the UE complexity, but at the same time, a cost reduction effect can be expected from mass production based on the expansion of use cases.

In the Case B, considering that the RedCap use case requirements are considerably diverse, a device type may be defined and supported for each RedCap use case. Even in this case, all the generic requirements may be commonly satisfied. In this instance, respective device types defined for each use case are referred to as RedCap device types. The Case B includes a case where several use cases that are similar in terms of requirements are grouped and supported in a single device type. These RedCap device types may be to support some or a specific combination previously defined among RedCap UE features. As above, when multiple RedCap device types are defined and support RedCap use cases, there is an advantage that specific RedCap use case(s) can be supported through a RedCap UE that is more optimized in terms of cost, power consumption, etc. For example, an IWS use case may be supported through a dedicated UE that is very small, inexpensive, and power efficient.

The RedCap use cases and the generic requirements or the use case specific requirements mentioned in the present disclosure are not necessarily supported or satisfied, and it may be determined whether to support or satisfy them in a trade-off type considering factors such as cost/complexity, power consumption, and form factor of the RedCap device or the device type.

In the present disclosure, reduced capability may include the meaning of reduced/low complexity/low cost/reduced bandwidth, and the like.

Redcap Device Type Classification and Method of Reporting to BS

For the case where RedCap use cases are supported by multiple device types (i.e., Case B), the following methods may be considered to classify the RedCap device types. The following methods can be applied even to the Case A in order to distinguish the RedCap device from the NR UE.

In order to support an operation of the RedCap device distinguished from the NR UE, the RedCap device may have to report device type information of the RedCap device to the base station. FIG. 11 illustrates a flow chart of a procedure of reporting device type information to a base station. The reporting procedure may reuse a UE capability transfer procedure defined in a predefined standard (e.g., 3GPP TS 38.331), as follows. The base station may acquire RedCap device type information through UE capability information reception and may use UE information acquired upon the scheduling of the corresponding UE.

For example, the base station/network may request UE capability from the UE in RRC_CONNECTED state (SH102). And/or, the UE may transmit the RedCap device type information to UE capability information (SH104).

[Classification Method 1]

Redcap device types may be classified based on one of main requirements. Examples of the main requirements that can be the basis of classification may include supported max data rate (peak bit rate), latency, mobility (stationary/fixed, portable, mobile, etc.), battery lifetime, complexity, coverage, and the like. (Combination of) UE feature(s) that shall be mandatorily supported or can be selectively supported for each classified RedCap device type may be defined in a predefined standard (e.g., 3GPP Specification). This may be to reduce overhead separately signaling whether to support features for each device type. In the present disclosure, 'defined in a predefined standard' may mean that it is predefined/pre-configured/pre-promised between the UE and the base station.

Redcap device type information that is included in UE capability information and is reported by the UE to the base station/network may be, for example, a specific field of UE-NR-Capability information element (IE) (e.g., RedCap-DeviceType). For example, when the RedCap device types are classified into RedCap device type 1, 2, . . . , a value of RedCapDeviceType field may be expressed by an integer value such as 1, 2, . . . , or a combination of character and integer such as r1, r2, . . . . As above, the UE has an advantage of signaling overhead by including the device type and parameters related to it in capability information as one field and reporting it.

For example, the RedCap device types may be classified based on a supported max data rate, and the UE may report the RedCap device type to the base station based on this classification.

The supported max data rate of the NR UE may be defined/determined as the following Equation in a predefined standard (e.g., 3GPP TS 38.306).

Supported Max Data Rate

General

The DL and UL max data rate supported by the UE may be calculated by band or band combinations supported by the UE. A UE supporting NR (e.g., NR SA, MR-DC) shall support the calculated DL and UL max data rate defined in the following.

Supported Max Data Rate

For NR, the approximate data rate for a given number of aggregated carriers in a band or band combination may be computed by the following Equation 3.

[Equation 3]

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

Wherein J is the number of aggregated component carriers in a band or band combination.

$$R_{max} = 948/1024$$

For the j-th CC, $$v_{Layers}^{(j)}$$

is the maximum number of supported layers given by higher layer parameter maxNumberMIMO-LayersPDSCH for downlink or higher layer parameters maxNumberMIMO-LayersCB-PUSCH and maxNumberMIMO-LayersNonCB-PUSCH for uplink.

$$Q_m^{(j)}$$

is the maximum supported modulation order given by higher layer parameter supportedModulationOrderDL for downlink and higher layer parameter supportedModulationOrderUL for uplink.

$f^{(j)}$ is the scaling factor given by higher layer parameter scalingFactor and can take the values 1, 0.8, 0.75, and 0.4.

$\mu$ is the numerology.

$$T_s^{\mu}$$

is the average OFDM symbol duration in a subframe for numerology $\mu$, i.e., $$T_s^{\mu} = \frac{10^{-3}}{14 \cdot 2^{\mu}}.$$

Normal cyclic prefix is assumed.

$$N_{PRB}^{BW(j),\mu}$$

is the maximum RB allocation in bandwidth $BW^{(j)}$ with numerology $\mu$, where $BW^{(j)}$ is the UE supported maximum bandwidth in the given band or band combination.

$OH^{(j)}$ is the overhead and takes the following values.

0.14, for frequency range FR1 for DL
0.18, for frequency range FR2 for DL
0.08, for frequency range FR1 for UL
0.10, for frequency range FR2 for UL Only one of the UL or SUL carriers is counted for a cell operating SUL.

The approximate maximum data rate can be computed as the maximum of the approximate data rates computed using the above Equation for each of the supported band or band combinations.

For single carrier NR SA operation, the UE shall support a data rate for the carrier that is no smaller than the data rate computed using the above Equation, with J=1 CC and component $$v^{(j)}_{Layers} \cdot Q^{(j)}_m \cdot f^{(j)}$$

is no smaller than 4.

For example, the value 4 in the component above can correspond to $$v^{(j)}_{Layers} = 1, Q^{(j)}_m = 4 \text{ and } f^{(j)} = 1.$$

For EUTRA in case of MR-DC, the approximate data rate for a given number of aggregated carriers in a band or band combination can be computed by the following Equation 4.

$$\text{Data rate (in } Mbps) = 10^{-3} \cdot \sum_{j=1}^{J} TBS_j \qquad \text{[Equation 4]}$$

Wherein J is the number of aggregated EUTRA component carriers in MR-DC band combination.

$TBS_j$ is the total maximum number of DL-SCH transport block bits received or the total maximum number of UL-SCH transport block bits transmitted, within a 1 ms TTI for j-th CC, as derived from a predefined standard (e.g., 3GPP TS36.213) based on the UE supported maximum MIMO layers for the j-th CC, and based on the maximum modulation order for the j-th CC and number of PRBs based on the bandwidth of the j-th CC according to indicated UE capabilities.

The approximate maximum data rate can be computed as the maximum of the approximate data rates computed using Equation 4 above for each of the supported band or band combinations.

For MR-DC, the approximate maximum data rate can be computed as the sum of the approximate maximum data rates from NR and EUTRA.

In this case, parameters required for the formula computing the supported max data rate that the NR UE shall support may be reported by the UE by a request of the base station in RRC_CONNECTED state. The parameters are as follows. The higher elements mean higher RRC information elements (IE) to which the parameters belong.
FeatureSetDownlink
   scaling Factor
FeatureSetDownlinkPerCC
   maxNumberMIMO-LayersPDSCH
   supportedModulationOrderDL
   supported Bandwidth DL
   supportedSubCarrierSpacingDL
FeatureSetUplink
   scalingFactor
FeatureSetUplinkPerCC
   maxNumberMIMO-LayersCB-PUSCH
   maxNumberMIMO-LayersNonCB-PUSCH
   supportedModulationOrderUL
   supportedBandwidthUL
   supportedSubCarrierSpacingUL For the RedCap UE, in a method of classifying the RedCap device types based on the supported max data rate, values of the parameters for each device type are defined in a predefined standard (e.g., 3GPP Specification), and the UE may indicate the RedCap device type information and information on the parameters to the base station by setting a value of RedCapDeviceType field of UE-NR-Capability IE to a specific value. Compared to the related operation that the NR UE includes the parameters in UE capability information and transmits it to the base station, the RedCap UE can expect an effect of signaling overhead reduction by reporting the device type and the parameters related to it through one field. The base station can acquire the device type, the supported max data rate, and the values of the parameters mentioned above through value of RedCapDeviceType field and use them in UE scheduling, etc.

[Classification Method 2]

Alternatively, RedCap device types may be classified based on (combination of) UR feature(s) that shall be mandatorily supported or can be selectively supported, not based on main requirements. This may be a more appropriate method when features that shall be supported or can be supported for each use case are clear.

(Combination of) UR feature(s) that is predefined for each RedCap device type in a predefined standard (e.g., 3GPP Specification) may be referred to as a feature set. A feature set that shall be mandatorily supported for each device type among (combination of) the UR feature(s) may be referred to as a mandatory feature set of the corresponding device type or specifying the device type.

In this method, definition of the RedCap device type may not be specified in the predefined standard (e.g., 3GPP Specification), and this may mean that the RedCap use cases are supported in separate device types supporting different feature sets.

In the above method, a RedCap UE may report a RedCap device type or use case(s) supported by the RedCap UE to a base station by reporting a predefined feature set to the base station. This can be seen as a method that more closely conforms to the basic philosophy of NR to support various use cases through various optional features without distinguishing a separate UE category. The feature set may be replaced by a combination of capability parameters (i.e., capability parameter set). The feature set may be a mandatory feature set defined in the predefined standard (e.g., 3GPP Specification) per RedCap device type.

For the above operation, a set of candidate features (i.e., feature pool) for RedCap device (type) may be defined or configured in the predefined standard (e.g., 3GPP Specification), and the RedCap device may report a mandatory feature set defined for each type based on a type of the RedCap device to the base station. The UE may additionally report an optional feature set in addition to the mandatory feature set to the base station. The UE may perform an additional operation or a more optimized operation for a specific use case by additionally selecting and reporting the optional feature set. For example, for a device type for a surveillance camera use case, when a wired power supply UE and a battery power supply UE coexist, the mandatory feature set does not include a power saving feature and may designate or include the optional feature. Hence, the UE may report the feature to the base station when selectively supporting the feature based on the detailed device type.

The base station may grasp whether to support the feature based on whether the corresponding parameter is present in the feature set reported by the RedCap UE, and reflect it upon the scheduling of the corresponding UE.

[Classification Method 3]

Alternatively, RedCap device types may be classified based on a combination of capability parameter(s). The combination of capability parameters classifying the Red-Cap device types may parameters determining the RedCap requirements. Examples of the capability parameters determining the RedCap device type may include UE supported bandwidth, modulation order, and number of MIMO layers determining a supported max data rate requirement supported by the UE. Values of the parameters may be a list of actually supportable values, or a maximum value among supported values.

For example, capability parameter(s) determining the RedCap device type may be as follows.

Supported Bandwidth (NRB): (max) UE channel bandwidth or (max) UE transmission bandwidth; in units of RB Supported modulation order (Qm): Qm=2 for QPSK; 4 for 16 QAM; 6 for 64 QAM; etc.

Supported number of MIMO layers (NL): replaceable with number of antennas (Na)

A combination of capability parameters determining the RedCap device type may be referred to as a capability parameter set of the corresponding device type. For example, the RedCap device type may be defined by classifying capability parameter set value(s) in ascending order (or descending order) of the supported max data rate. The following example is an example of defining M device types in ascending order of the supported max data rate.

Classification (example) of Redcap device types based on capability parameter set value(s):

Device Type 1: $\{NL, NRB, Qm\}=\{1, 25, 2\}$

Device Type 2: $\{NL, NRB, Qm\}=\{1, 25, 4\}$, or $\{1, 52, 2\}$

Device Type 3: $\{NL, NRB, Qm\}=\{1, 52, 4\}$, or $\{1, 106, 2\}$

Device Type 4: $\{NL, NRB, Qm\}=\{1, 106, 4\}$, or $\{2, 106, 2\}$

Device Type 5: $\{NL, NRB, Qm\}=\{1, 106, 6\}$

Device Type 6: $\{NL, NRB, Qm\}=\{2, 106, 4\}$

Device Type 7: $\{NL, NRB, Qm\}=\{2, 106, 6\}$

. . .

Device Type M: $\{NL, NRB, Qm\}=\{X, Y, Z\}$

For example, for NR frequency range 1 (FR1) (i.e., band of 6 GHz or less), NRB value may use one value among values defined in Table 10 (the number of configurable maximum RBs per UE channel bandwidth). The above example is value based on subcarrier spacing (SCS)=15 kHz. If the RedCap device supports SCS=30 kHz, and a cell that the RedCap device wants to access uses SCS=30 kHz for data transmission, the NRB value based on SCS=15 kHz in the above example may be replaced by a value corresponding to SCS=30 kHz with reference to Table 10.

Table 10 represents max transmission bandwidth configuration NRB per subcarrier spacing (SCS) at NR FR1.

TABLE 10

| SCS (kHz) | 5 MHz $N_{RB}$ | 10 MHz $N_{RB}$ | 15 MHz $N_{RB}$ | 20 MHz $N_{RB}$ |
|---|---|---|---|---|
| 15 | 25 | 52 | 79 | 106 |
| 30 | 11 | 24 | 38 | 51 |

In the device type classification example, the device Type 2/3/4 is a case of defining one device type using multiple capability set values. As above, when the device types are classified based on the supported max data rate, multiple capability parameter set values defining one device type may mean combinations supporting the same or similar supported max data rate.

Supportable device type(s) for each use case using the device type(s) defined in the above example may be defined as follows. Based on the supportable device type(s), the base station may restrict the cell access, or perform subscription based barring.

Supportable device type(s) (example) for each use case

IWS: Device types 1, 2

Video Surveillance: Device types 2, 3

Wearables: Device type: Device types 4, 5, 6, 7

In order to avoid an increase in cost due to market segmentation according to an excessive division of the device type, the number M of device types may be limited. For example, when M=1, the RedCap UE is not classified into the multiple device types, and can support all the target use cases in a single device type.

As another example, when M=3, device type classification and supportable device type(s) for each use case may be defined as follows.

Device type classification based on capability set value(s) (e.g., when M=3):

Device Type 1: $\{NL, NRB, Qm\}=\{1, 25, 2\}$ (or $\{1, 25, 4\}$ or $\{1, 52, 2\}$)

Device Type 2: $\{NL, NRB, Qm\}=\{1, 52, 4\}$ or $\{1, 106, 2\}$

Device Type 3: $\{NL, NRB, Qm\}=\{2, 106, 6\}$

Supportable device type(s) for each use case (e.g., when M=3)

IWS: Device types 1

Video Surveillance: Device types 3

Wearables: Device type: Device types 7

A UE max bandwidth (i.e., bandwidth capability of the RedCap UE) may be determined as a minimum bandwidth satisfying a bit rate required in a target use case. A UE max bandwidth reduction can reduce RF element and/or baseband processing cost and expect an effect of reducing power consumption. Herein, the required bit rate may mean a peak rate or the supported max data rate considering that the device manufacturing cost is determined by the peak rate or the supported max data rate not an average bit rate and a reference bit rate.

When determining the max bandwidth supporting the required bit rate, a specific value may be assumed for other parameters (e.g., number of antennas (NL), modulation order (Qm), etc.) determining the required bit rate. For example, in the above example, for Device Type 3, a peak rate of about ~28 MHz may be supported. In this instance, the required max bandwidth may be 20 MHz (106 RBs) when $\{NL=1, Qm=2\}$ is assumed, and 10 MHz (52 RBs) when $\{NL=1, Qm=4\}$ is assumed. Or, the required max bandwidth may be 5 MHz (25 RBs) when $\{NL=2, Qm=4\}$ is assumed.

Device Type 3: $\{NL, NRB, Qm\}=\{1, 52, 4\}$, or $\{1, 106, 2\}$

Within the max UE bandwidth of the RedCap UE, a transmission bandwidth may be assigned and transmitted/received by network configuration using RRC signaling, etc.

A UE min bandwidth may be defined as a minimum value among NR UE channel bandwidths (or transmission bandwidths) greater than or equal or an NR SSB bandwidth.

For example, at FR1, the UE min bandwidth may be 5 MHz for NR SSB with SCS=15 kHz, and may be 10 MHz for NR SSB with SCS=30 kHz.

As another example, at FR2, the UE min bandwidth may be 40 MHz for NR SSB with SCS=120 kHz, and may be 80 MHz for NR SSB with SCS=240 kHz.

This may be to implement low power consumption and at the same time support an access on an NR cell via NR SSB by supporting a service, in which the required bit rate is small, at a minimum bandwidth.

[Classification Method 4]

Considering that a bandwidth capability of a RedCap UE is determined by a required bit rate of respective use cases, a RedCap device type may be classified based on a UE bandwidth capability. For example, a bandwidth capability determining the RedCap device type may be to represent a (max) UE channel bandwidth or a (max) UE transmission bandwidth (i.e., supported bandwidth (NRB)) in units of RB. Alternatively, the bandwidth capability may be a minimum UE channel bandwidth or a minimum UE transmission bandwidth. More specifically, the following classification is possible.

Classification method 4-1) The RedCap device type is classified by a max bandwidth and is used by being configured with an actual data transmission/reception bandwidth (<=max bandwidth)

Classification method 4-2) The RedCap device type is classified by a min bandwidth and is used by being configured with an actual data transmission/reception bandwidth (>=min bandwidth)

Classification method 4-3) One or multiple supportable bandwidths (set) are defined for each device type, and is used by being configured with an actual data transmission/reception bandwidth within the corresponding bandwidth (set)

For the classification methods 4-1/2/3, the max bandwidth may be limited to a value (e.g., 20 MHz) less than an NR bandwidth, and the min bandwidth may be greater than or equal to an SSB bandwidth (e.g., 5 MHz for 15 kHz SSB).

Method of Receiving System Information for Access of Redcap User Equipment to Cell The present disclosure proposes a method for allowing a redcap user equipment (UE) to receive system information for access to a cell even when the max UE bandwidth of the redcap user equipment (UE) is smaller than an SSB bandwidth (BW) of a cell to be accessed (for example, a BW of the SS/PBCH block) or a control resource set #0 (CORESET #0) BW (for example, a BW of CORESET for the PDCCH for scheduling an SIB such as SIB1).

In the present disclosure, the max UE bandwidth may mean a maximum transmission or reception bandwidth supported by the UE (in an initial access step). And/or, the max UE bandwidth may mean a maximum transmission bandwidth (for example, excluding a guard band from a channel bandwidth) that the UE can use for actual transmission or reception in the channel. And/or, the max UE bandwidth may be expressed in units of RBs.

FIG. 12 illustrates a flowchart of a method for receiving system information, to which the present disclosure can be applied.

Referring to FIG. 12, a base station may transmit a physical broadcast channel (PBCH) (for example, SSB) to a UE, and the UE may receive the PBCH from the base station (SH202). For example, in the present disclosure, a PBCH or a synchronization signal block may be replaced with an SS/PBCH block and applied. According to the proposed method of the present disclosure, CORESET #0 (and/or CORESET #0-R) related information and/or MO (and/or MO-R) related information may be configured through information (for example, master information block (MIB))) included in the PBCH and transmitted/received.

And/or, the base station may transmit system information block 1 (SIB1) scheduling information to the UE through CORESET #0, and the UE may receive the SIB1 scheduling information from the base station through CORESET #0 (SH204). For example, the SIB1 scheduling information may be a physical downlink control channel (PDCCH) carrying downlink control information (DCI) for scheduling the SIB. The SIB1 scheduling information may be configured and transmitted/received according to the method proposed in the present disclosure.

And/or, the base station may transmit the SIB1 to the UE based on the SIB1 scheduling information, and the UE may receive the SIB from the base station based on the SIB1 scheduling information (SH206). According to the method proposed in the present disclosure, SIB1 may include NR SIB1 (or SIB1 of the related art) and/or SIB1-R. For example, the SIB1 may be transmitted through a physical downlink shared channel (PDSCH).

The CORESET #0/(search space, SS) configuration method proposed in the present disclosure may be applied to the PBCH transmission/reception process (SH202), the SIB1 scheduling information transmission/reception process (SH204), and/or the SIB1 transmission/reception process (SH206).

FIG. 13 illustrates a case in which a problem occurs in SIB1-PDSCH reception in a method of the related art because a max UE bandwidth supported by the redcap UE is smaller than a CORESET #0 BW in the process (SH206) in which the redcap UE receives the SIB1-PDSCH in the order of FIG. 12. In FIG. 13, a UE reception bandwidth (UE Rx BW) means a reception frequency band determined (or available) by the redcap UE for CORESET #0 reception, and may be equal to the max UE bandwidth. In FIG. 13, the UE Rx BW includes the entire SSB (for example, the UE can receive the SS/PBCH), but does not include a part of CORESET #0 due to restrictions on the max UE bandwidth. Further, since a significant part of the SIB1-PDSCH is not included in the UE Rx BW, serious reception performance degradation is expected. For example, there is a problem in that the UE cannot correctly receive the PDCCH on CORESET #0, and cannot correctly receive the SIB-PDSCH even when it is assumed that the UE has correctly received the PDCCH on CORESET #0.

In FIG. 13, SIB1-PDSCH scheduled by SIB1-DCI transmitted through CORESET #0 is connected by an arrow. Since a general NR UE is obligatory to support the SSB and the CORESET #0 BW, a UE behavior for a case in which a part of the CORESET #0 BW is received is not separately specified in a predefined standard (for example, 3GPP Specification). In this situation, when the redcap UE has no choice but to receive a part of the CORESET #0 BW due to a max UE bandwidth restriction (for example, when PDCCH blind detection is possible only for some frequency domains of the CORESET #0 BW) and when the base station knows this in advance, the PDCCH/SIB-1-PDSCH can be transmitted within a frequency domain that can be monitored by the UE, and the above performance degradation may not occur. In the present disclosure, receiving CORESET #0 may mean performing blind decoding or PDCCH monitoring in CORESET #0.

However, there is a problem in that the situation of FIG. 13 may occur because the base station cannot predict a UE Rx bandwidth received (or subjected to frequency tuning) by the UE in advance. In this case, the redcap UE can acquire frequency domain resource allocation (FDRA) information of the SIB1-PDSCH after decoding SIB1-DCI transmitted through CORESET #0, and when there is a decoding latency of the UE for SIB1-DCI, SIB1-PDSCH cannot be received in a slot in some cases because SIB1-PDSCH cannot be received during a relevant time.

The present disclosure proposes a method capable of solving SIB1-PDSCH reception performance degradation/ reception delay/reception failure problem that may occur when the max UE bandwidth of the redcap UE is smaller than CORESET #0 BW, as illustrated in FIG. 13.

That is, the present disclosure proposes a method for determining a bandwidth for CORESET #0 reception of the redcap UE (hereinafter, a first embodiment), a method for ensuring a retuning gap for PDSCH reception of the redcap UE (hereinafter, a second embodiment), and a method for selectively or jointly applying the first embodiment and the second embodiment (hereinafter, a third embodiment).

Hereinafter, embodiments to be described in the present disclosure are only classified for convenience of description, and it is apparent that some methods and/or some configurations of a certain embodiment may be substituted with methods and/or configurations of other embodiments, or the methods and/or configurations may be applied in combination with each other.

The methods proposed in the present disclosure may be applied differently according to a CORESET #0 configuration and/or search space set (SS) configuration of a cell to be accessed. For example, for a CORESET #0/SS configuration illustrated in FIG. 19, a method for receiving a bandwidth as much as the redcap UE max bandwidth in ascending order of the RB index from the lowest RB index in method 1-1 cannot be applied since the method may cause a problem in SSB reception. Therefore, an appropriate or applicable method may be predefined for each CORESET #0/SS configuration in a predefined standard (for example 3GPP Specification), the UE receives an indication of the CORESET #0/SS configuration from the base station through the MIB, one (for example, method 1-1/method 1-2/method 1-3/second embodiment/third embodiment) of the proposed methods may be determined, or the base station may indicate the method to the UE through separate higher layer signaling. And/or, since the indication is information required at the time of a UE Rx BW configuration for CORESET #0 reception, the higher layer signaling for the purpose may be indicated to the UE through an MIB or PBCH payload.

In the present disclosure, "when the max UE bandwidth of the redcap UE is smaller than CORESET #0 BW" may be referred to as "the case of a small redcap BW" for convenience.

In the present disclosure, "SIB1-PDCCH" may be referred to as "PDCCH" and/or "SIB1-PDSCH" may be referred to as "PDSCH".

The above content (3GPP system, frame structure, NR system, and the like) can be applied in combination with methods proposed in the present disclosure to be described below, and/or supplemented to clarify technical characteristics of the methods proposed in the present disclosure.

Meanwhile, classification (index) of the respective methods in the following description is for convenience of description, and it will be understood by those skilled in the art that the respective methods do not necessarily have to be independently performed, and a combination of a plurality of methods that do not conflict with each other may be implemented as one invention.

In the present disclosure, '( )' can be interpreted as both excluding the content in ( ) and including the content in parentheses.

In the present disclosure, '/' may mean including all content separated by/(and) or including only a part of the separated content (or).

First Embodiment

In the first embodiment, a method for determining a CORESET #0 Rx bandwidth of a redcap UE or a method for predefining the method in a predefined standard (for example, 3GPP Specification) will be described.

The first embodiment is a method for predefining a method with which the redcap UE determines the reception frequency band (that is, the UE Rx BW) for CORESET #0 reception in the case of a small redcap BW. The UE/base station may be configured/implemented in advance to be operated according to such a pre-definition. In this case, since the base station can know the UE Rx BW for CORESET #0 reception of the redcap UE in advance, such advance information can be used for SIB1-PDSCH scheduling for the redcap UE. For example, the base station may perform scheduling so that the SIB1-PDSCH belongs to the UE Rx BW for CORESET #0 reception of the redcap UE.

And/or, the base station does not limit a scheduling frequency domain of the SIB1-PDSCH to the UE Rx BW of the redcap UE for reasons such as coexistence of the NR UE and the redcap UE, and resultant PDSCH reception performance degradation of the redcap UE may be compensated for by setting a modulation and coding scheme (MCS) (or code rate) of a transport block (TB) for SIBI transmission to be low (for example, using a low modulation order) and signaling information through SIB1-DCI. That is, this may enable correct decoding in an upper layer even when the redcap UE receives only a part of a SIB1-PDSCH signal in the physical layer.

In the case of a small redcap BW, the following methods are proposed as a method with which the redcap UE determines the UE Rx BW in order to receive CORESET #0. For example, the following methods may be applied only to a CORESET #0 configuration including all 20 RBs constituting the SSB in the UE Rx BW or including at least all of synchronization signals (SS) consisting of the center 12 RBs among 20 RBs as a result of applying the methods. That is, the following methods can be applied only to a configuration capable of receiving SSB (or SS) and CORESET #0 without frequency retuning (and power consumption or time delay due to the frequency retuning). Otherwise, effects of the proposed method of the first embodiment may not be expected or may be small as compared to a case in which a restriction is applied to base station SIB1-PDSCH scheduling. For example, SS may mean a primary synchronization signal (PSS) and/or a secondary synchronization signal (SSS).

The methods to be described below are only classified for convenience of description, and it is apparent that a configuration of one method may be substituted with a configuration of another method or the methods may be applied in combination with each other.

Method 1-1

In method 1-1, a method for receiving a bandwidth as much as the redcap UE max bandwidth in ascending (or descending) order of RB index from the lowest (or highest) RB index of the CORESET #0 BW will be described.

FIG. 14 illustrates an example of a method for receiving system information.

Referring to FIG. 14, the UE may receive an SSB/PBCH (that is, SS/PBCH block) based on a first UE RX BW (H405). The first UE RX BW may include an SSB BW that is transmitted by the base station.

And/or, the UE may determine a second UE RX BW based on the received SSB (H410). For example, the UE may acquire configuration information of CORESET #0 from information acquired through the SSB reception, and determine the second UE RX BW for receiving a PDCCH through CORESET #0 and/or receiving a PDSCH (for example, SIB1) scheduled with the PDCCH.

And/or, the UE may perform frequency retuning from the first UE RX BW to the second UE RX BW (H415).

And/or, the UE may receive the PDCCH and/or SIB1-PDSCH from the second UE RX BW (H420 and H425). For example, the UE may expect that the base station will transmit the PDCCH and/or SIB1-PDSCH in the second UE RX BW, and perform a PDCCH and/or SIB1-PDSCH reception process. And/or, the base station (which desires to support the redcap UE) may transmit the PDCCH and/or SIB1-PDSCH in the second UE RX BW (H420 and H425).

For example, X may be a value in which the max UE bandwidth of the redcap UE is indicated/configured/defined as the number of RBs for each subcarrier spacing (SCS). For example, X=106, 51, 24 for SCS=15 kHz, 30 kHz, and 60 kHz in the case of 20 MHz UE max bandwidth in FR1, X=66, 32 for SCS=60 kHz and 120 kHz in the case of 50 MHz UE max bandwidth in FR2, and/or X=132 and 66 for SCS=60 kHz and 120 kHz in the case of 100 MHz UE max bandwidth.

In this case, method 1-1 may be a method with which the redcap UE receives RBs having RB indexes from the lowest RB index to a lowest RB index+X−1 of the CORESET #0 BW. Alternatively, method 1-1 may be a method for mapping/transmitting a DL signal to an RB area from the viewpoint of the base station.

Alternatively, method 1-1 may be a method for receiving RBs having RB indices from the highest RB index to a highest RB index−X+1 of the CORESET #0 BW in the case of reception as many as X RBs from the highest RB index. Alternatively, method 1-1 may be a method for mapping/transmitting a DL signal to an RB area from the viewpoint of the base station.

FIG. 15 illustrates a case in which a bandwidth is received as much as the redcap UE max bandwidth from the lowest RB index of the CORESET #0 BW in method 1-1. In FIG. 15 and subsequent figures, two parallel lines indicated by solid lines may indicate the UE Rx BW of the redcap UE determined for CORESET #0 reception through the proposed method after the redcap UE receives the SSB. On the other hand, in FIG. 15 and subsequent drawings, two parallel lines indicated by dashed lines may mean a reception band determined by the UE for SSB reception. For example, a reception band determined for SSB reception may mean a reception band determined based on a synchronization raster before the UE acquires CORESET #0 scheduling information. For example, the synchronization raster may be intended to determine a frequency position of the SSB.

When the UE determines the UE Rx BW for CORESET #0 reception using method 1-1, the base station may schedule the SIB1-PDSCH to be included in the UE Rx BW, as illustrated in FIG. 15, so that the redcap UE can receive the SIB1-PDSCH without performance degradation.

Further, FIG. 15 illustrates that, when the redcap UE determines the UE Rx BW using method 1-1, some of the SSBs may not be included in the UE Rx BW for subsequent SSBs. Even in this case, when the SS (for example, PSS/SSS) occupying center 12 RBs among the 20 RBs constituting the SSB is included in the UE Rx BW, a slight delay may be caused at the time of access of the redcap UE to the cell due to slight performance degradation of the PBCH.

According to method 1-1, when the UE determines the second UE RX BW based on the received SSB (H410), the second UE RX BW may be determined in ascending (or descending) order of the RB index from the lowest (or highest) RB index of the CORESET #0 BW. A size of the first UE RX BW may be the same as a size of the second UE RX BW.

Method 1-2

In method 1-2, a method for receiving a bandwidth as much as the redcap UE max bandwidth in ascending (or descending) of RB index from the lowest (or highest) RB index of the CORESET #0 BW that overlaps the lowest (or highest) RB of the SSB will be described. Method 1-2 may include a method for receiving a bandwidth as much as the redcap UE max bandwidth in ascending (or descending) order of RB index from the lowest (or highest) RB index of the SSB.

An example in which a case in which all SSB 20 RBs are not included in the UE Rx BW may occur in method 1-1 described with reference to FIG. 15 has been described. Method 1-2 may have an advantage in terms of the SSB reception performance (for example, more specifically, PBCH reception performance) due to a difference in that all 20 RBs of the SSB can be received as compared to method 1-1. Method 1-2 may be a method for receiving RBs having RB indices from nRB of the CORESET #0 BW to nRB+X−1 in the case of the lowest RB when the lowest (or highest) RB index of the CORESET #0 BW overlapping the lowest (or highest) RB of the SSB is nRB. Alternatively, method 1-2 may be a method for receiving RBs having RB indices from nRB to nRB-X+1 of the CORESET #0 BW in the case of the highest RB.

FIG. 16 illustrates a case in which a bandwidth is received as much as redcap UE max bandwidth in descending order of RB index from the highest RB index of the CORESET #0 BW overlapping the highest RB of the SSB in method 1-2. Alternatively, FIG. 16 may illustrate an example of a case in which a bandwidth is received as much as redcap UE max bandwidth in descending order of RB index from the highest RB index of the SSB in method 1-2. Referring to FIG. 16, SSB 20 RBs are all included in the UE Rx BW, unlike the example of FIG. 15. When the UE determines the UE Rx BW for CORESET #0 reception using method 1-2, the base station may schedule the SIB1-PDSCH to be included in the UE Rx BW, as illustrated in FIG. 16. That is, method 1-2 can perform scheduling so that all of SIB1-PDSCH transmission RBs can be received.

FIG. 14 may be referred to for method 1-2. However, according to method 1-2, when the UE determines the second UE RX BW based on the received SSB (H410), for example, the highest RB of the second UE RX BW may be determined as the highest RB index of the CORESET #0 BW overlapping the highest RB of the SSB. Alternatively, the highest RB of the second UE RX BW may be determined as the highest RB index of the SSB. Further, the size of the second UE RX BW may be the same as that of the first UE RX BW. Therefore, the UE may receive the entire SSB through the second UE RX BW even after frequency retuning (H415). For example, the second UE RX BW may include the entire SSB.

The SSB of method 1-2 may be replaced with SS (for example, PSS/SSS). That is, including all of the SSB 20 RBs in the UE Rx BW may be replaced with including only all SSs occupying the center 12 RBs among the SSB 20 RBs. Both methods may have the same advantage in that SSB and CORESET #0 can be received without frequency retuning. However, the method in which the SSB is replaced with SS (for example, PSS/SSS) and interpretation is performed may have differences in a slight PBCH reception delay due to a difference in PBCH reception performance, and a difference of about 4 RBs in the position of the UE Rx BW when the respective methods are applied. For example, when the UE determines the second UE RX BW based on the received SSB (H410), the highest RB of the second UE RX BW may be determined as the highest RB index of the CORESET #0 BW overlapping the highest RB in which the SS (for example, PSS and SSS) is transmitted. Further, the size of the second UE RX BW may be the same as that of the first UE RX BW.

Method 1-3

In method 1-3, a method for receiving a bandwidth as much as the redcap UE max bandwidth around a center frequency of CORESET #0 will be described. Method 1-3 may be a method for receiving RBs having an RB index from nRB+(NRB-X)/2 to nRB+(NRB-X)/2+X−1 of the CORESET #0 BW in the case of the highest RB when the lowest (or highest) RB index of the CORESET #0 BW is nRB and CORESET #0 BW is NRB. Alternatively, method 1-3 is a method for receiving RBs having RB indices from nRB-(NRB-X)/2 to nRB+(NRB-X)/2−X+1 of CORESET #0 BW in the case of the highest RB. In this case, when a resultant value of (NRB-X)/2 is not always an integer, (NRB-X)/2 can be changed to an equation including integerization such as floor((NRB-X)/2) or ceil((NRB-X)/2). FIG. 17 illustrates method 1-3.

According to example 1 of method 1-3, there is an advantage that processes H410 and H415 in FIG. 14 may be omitted. For example, the redcap UE may receive PDCCH/PDSCH without frequency retuning. As described above, a frequency domain in which SIB1-PDSCH (H425) is received may be (i) RBs having RB indexes from nRB+(NRB-X)/2 to nRB+(NRB-X)/2+X−1 of the CORESET #0 BW with reference to the lowest RB or may be (ii) RBs having the RB index from nRB-(NRB-X)/2 to nRB+(NRB-X)/2−X+1 of the CORESET #0 BW with reference to the highest RB.

FIG. 18 illustrates an example in which method 1-3 is applied to another CORESET #0/SS configuration supported by NR (example 2).

For example, according to the example of method 1-3, after the UE receives the SSB, the UE may change the UE Rx BW to receive as much as the redcap UE max bandwidth around the center frequency of CORESET #0, and receive CORESET #0 and PDSCH within the UE Rx BW. For example, in the case of method 1-3, the UE may receive the SSB by tuning the UE Rx BW around the center frequency of the SSB before receiving the SSB, and the UE may receive CORESET #0 and PDSCH by retuning the UE Rx BW around the center frequency of CORESET #0 before receiving CORESET #0.

For example, in method 1-3, CORESET #0 can be replaced with the SSB. When this method is referred to as a method for receiving a bandwidth as much as the redcap UE max bandwidth around the center frequency of the SSB, an effect of solving the disadvantage that a part of the PBCH in the SSB is not unnecessarily received in a CORESET #0/SS configuration of the form illustrated in FIG. 18 can be expected from the method. For example, according to example 2 of method 1-3, when the UE determines the second UE RX BW in FIG. 14 (H410), the UE may determine the second UE RX BW based on the lowest index RB of the SSB. Further, the size of the second UE RX BW may be the same as that of the first UE RX BW.

FIG. 19 illustrates an example in which a method for receiving a bandwidth as much as redcap UE max bandwidth around a center frequency of the SSB in the same CORESET #0/SS configuration as in FIG. 18 is applied. This method may be a method in which the redcap UE receives RBs having an RB index from nRB-X/2 to nRB+X/2−1 of the CORESET #0 BW when an RB index of the CORESET #0 BW overlapping the center frequency of the SSB is an nRB. For example, the center frequency of the SSB may be defined as a position of a first subcarrier index (subcarrier index=0) of an 11-th RB (RB index=10) among SSB 20 RBs. According to the example of FIG. 19, there is an advantage in that the processes H410 and H415 in FIG. 14 may be omitted.

Second Embodiment

In the second embodiment, a method for guaranteeing a retuning gap for CORESET #0 Rx of the redcap UE will be described. Alternatively, in the second embodiment, a method for guaranteeing a retuning gap for PDSCH reception of the redcap UE will be described. And/or, when the retuning gap is guaranteed, the UE may perform frequency retuning before receiving the SIB1-PDSCH after receiving CORESET #0, and then can receive the SIB1-PDSCH. For example, a frequency retuning method may conform to method 1-1/method 1-2/method 1-3.

The second embodiment is a method for guaranteeing a retuning time between the SIB1-PDCCH and the SIB1-PDSCH transmitted through CORESET #0 so that the redcap UE can receive the SIB1-PDSCH through frequency retuning, instead of the base station transmitting the SIB1-PDSCH without the scheduling restriction in terms of FDRA, which is a disadvantage of the first embodiment.

Accordingly, the second embodiment may be used together with the first embodiment. In this case, as a method for guaranteeing the retuning time in the base station, it is specified in a predefined standard (for example, 3GPP Specification) that the redcap UE does not expect a case in which a combination of all or some of the slot offset (K0), the start symbol (S), and the allocation length in symbols (L), or a specific value (for example, K0 or S) thereof does not satisfy a specific condition considering the retuning time. For example, a combination of all or some of the slot offset (K0), the start symbol (S), and the allocation length in symbols (L) may be modified to guarantee a frequency retuning time of the UE. For example, the specific conditions may be as follows:

A SIB1-PDCCH-to-SIB1-PDSCH scheduling time indicated by K0 and S should be greater than a sum of a PDCCH decoding time and a retuning time (or a sum of the PDCCH decoding time and the retuning time should not be smaller than the SIB1-PDCCH-to-SIB1-PDSCH scheduling time).

And/or, when the SIB1-PDCCH-to-SIB1-PDSCH scheduling time indicated by K0 and S exceeds the sum of the PDCCH decoding time and the retuning time, an exceeding time should be smaller than X symbols when the exceeding time is converted into the number of symbols. For example, the number X may be a value relative to L or may be a value determined as a maximum value at which X/L does not exceed a specific ratio. And/or, a value of X may be defined for each SCS.

Minimum PDCCH-to-PDSCH scheduling offset information for guaranteeing the retuning time or retuning time can be defined as a UE capability parameter so that the redcap UE can report the minimum PDCCH-to-PDSCH scheduling offset information to the base station. In the case of system information required to be received at an initial access stage, the minimum PDCCH-to-PDSCH scheduling offset information for guaranteeing the retuning time for each redcap device or redcap device type may be predefined in a predefined standard (for example, 3GPP Specification). The redcap UE may determine whether or not the SIB1-PDSCH is received by using the predefined information (by type) according to the proposed method of the second embodiment.

For example, it may be defined in a predefined standard (for example, 3GPP Specification) that the redcap UE does not expect a case in which a K0 value corresponding to the row index of the default TDRA table indicated by the TDRA value of SIB1-DCI is 0 (that is, same-slot scheduling) or reception of the SIB1-PDSCH indicated by the DCI is not required for the redcap UE when the K0 value indicated by the method is 0.

Third Embodiment

In the third embodiment, a method for selectively or jointly applying the first embodiment and the second embodiment will be described.

The first embodiment has a disadvantage in that an unnecessary scheduling restriction is applied in terms of frequency domain resource allocation from the perspective of NR UE. For example, the NR UE other than the redcap UE may have a disadvantage in that some available frequency resources are not utilized due to the redcap UE. For example, in order to minimize such disadvantages, the proposed method of the first embodiment may be considered limitedly and only when absolutely necessary. For example, the proposal method of the first embodiment may be selected only when a combination of all or some of slot offset (K0), start symbol (S), and allocation length in symbols (L) corresponding to the row index of the default TDRA table indicated by the TDRA value of SIB1-DCI, or a specific value (for example, 0 or S) does not satisfy the specific conditions described in the proposal method of the second embodiment and, otherwise, the proposal method of the second embodiment without the scheduling restriction may be selected.

For example, the redcap UE may apply the proposed method of the first embodiment when the K0 value corresponding to the row index of the default TDRA table indicated by the TDRA value of SIB1-DCI is 0 (that is, same-slot scheduling), and may apply method 2 when the K0 value is not 0.

Alternatively, the redcap UE applies/performs the proposed method of the first embodiment, and when the specific condition is satisfied, the redcap UE may determine the UE Rx BW again or perform frequency retuning before receiving the SIB1-PDSCH, and then receive the SIB1-PDSCH. When the specific condition is not satisfied, the redcap UE may apply/perform only the proposed method of the first embodiment.

For example, referring to FIG. 14, the redcap UE applies/performs the proposed method of the first embodiment in steps H410 to H415 and receives the PDCCH (H420), and when the K0 value corresponding to the row index of the default TDRA table indicated by the TDRA value of SIB1-DCI is not 0, the redcap UE may perform frequency retuning between steps H420 and H425 and receive SIB1-PDSCH (H425). For example, the frequency retuning between steps H420 and H425 may be performed by method 1-1, method 1-2, or method 1-3. Alternatively, when the K0 value corresponding to the row index of the default TDRA table indicated by the TDRA value of SIB1-DCI is 0, the redcap UE may apply/perform the proposed method of the first embodiment in steps H410 to H415 to receive PDCCH/SIB1-PDSCH. For example, the default TDRA table indicated by the TDRA value may be set by remote resource control (RRC) signaling.

When the UE determines the UE Rx BW or receives the SIB1-PDSCH through frequency retuning by applying the methods proposed in the first embodiment/second embodiment/third embodiment, the redcap UE may receive only a part of the SIB1-PDSCH signal in a physical layer. In this case, the redcap UE may not expect reception of SIB1-PDSCH. Alternatively, when a non-reception ratio exceeds a specific value, the redcap UE may not expect to receive the SIB1-PDSCH. For example, when a ratio of the SIB1-PDSCH RBs not included in the UE Rx BW or a ratio of the SIB1-PDSCH RBs scheduled outside the UE Rx BW is equal to or more than X % of all SIB1-PDSCH RBs, the UE may not expect the reception.

Alternatively, the UE may not expect the reception when a time interval (or symbol interval) of the SIB1-PDSCH that cannot be received due to an insufficient secured retuning time is equal to or more than Y % of a total SIB1-PDSCH time interval (or symbol interval) in a situation in which SIB1-PDSCH should be received through frequency retuning. This method is intended to prevent a reception performance deterioration problem that may occur when the redcap UE fails to receive the SIB1-PDSCH for some time period (or symbol period) for a retuning operation, and a problem that a system information reception time becomes excessively long due to the performance deterioration. The above method may be applied only to a case in which K0=0 because reception of all may be possible through frequency retuning when the value of K0 is not 0.

The above methods are not limited to the redcap UE receiving SIB1(-R) for access to a cell, but the same may apply to reception of SIBx (x>1) transmitted with a CORESET #0 BW, a common channel, or a broadcast channel. The above methods can be applied to reception of paging information with the CORESET #0 BW or reception of msg2/msg4 (or msgB) in a 4-step (or 2-step) random access process. For example, the above methods may be applied to reception of DCI format 1_0 with CRC (Cyclic Redundancy Check) scrambled by P-RNTI (Paging-Radio Network Temporary Identifier)/TC (Temporary Cell)-RNTI/RA (Random Access)-RNTI/msgB (messageB)-RNTI with the CORESET #0 BW.

FIG. 20 is a flowchart illustrating a method for operating a UE proposed in the present disclosure.

Referring to FIG. 20, first, the UE (100/200 of FIGS. 22 to 25) may receive a synchronization signal (SS)/physical broadcast channel (PBCH) block from the base station in step S2001.

For example, content described with reference to FIGS. 8 to 9 related to the SS/PBCH block may be referred to.

For example, the UE may be a reduced capability (RedCap) UE. And/or, the bandwidth is smaller than the bandwidth of CORESET #0 and may be determined in units of resource blocks (RBs). For example, the UE may be UE with a reduced max UE bandwidth.

For example, the UE may report device type information to the base station before or after receiving the SS/PBCH block. For example, the report-related operation/configuration of device type information may refer to the redcap device type classification and the method for report to the base station described above.

For example, the SS/PBCH block may include information on the frequency position of CORESET #0.

For example, the operation of receiving the SS/PBCH block by the UE in step S2001 may be implemented by the device of FIGS. 22 to 25 described above. For example, referring to FIG. 23, one or more processors 102/202 may control one or more memories 104/204, one or more transceivers 106/206, and/or the like to receive the SS/PBCH block.

And/or, the UE (100/200 of FIGS. 22 to 25) may determine the bandwidth for CORESET #0 based on at least one of the frequency position of the SS/PBCH block and/or the frequency position of the control resource set (CORESET) #0 in step S2002.

For example, the bandwidth may be determined as much as a maximum bandwidth of the UE (for example, the UE Rx BW/max UE bandwidth) in ascending order from the lowest resource block (RB) index of CORESET #0, as illustrated in FIG. Alternatively, the bandwidth may be determined as much as the maximum bandwidth (for example, max UE bandwidth) of the UE in descending order from the highest RB index of CORESET #0. For a more detailed operation/description, the above-described method 1-1 may be referred to.

And/or, the bandwidth may be determined as much as the maximum bandwidth of the UE (for example, the max UE bandwidth) in ascending order from the lowest resource block (RB) index of the SSB/PBCH block. Alternatively, the bandwidth may be determined as much as the maximum bandwidth of the UE (for example, the UE Rx BW/max UE bandwidth) in descending order from the highest RB index of the SSB/PBCH block, as illustrated in FIG. 16. For a more specific operation/description, the above-described method 1-2 may be referred to.

And/or, the bandwidth may be determined as much as the maximum bandwidth of the UE (for example, the UE Rx BW/max UE bandwidth) around the center frequency of CORESET #0, as illustrated in FIG. 18. For a more specific operation/description, the above-described methods 1-3 may be referred to.

And/or, the bandwidth may be determined as much as the maximum bandwidth of the UE (for example, the UE Rx BW/max UE bandwidth) around the center frequency of the SS/PBCH block, as illustrated in FIG. 17 or 19. For a more specific operation/description, the above-described methods 1-3 may be referred to.

For example, the operation of determining the bandwidth for CORESET #0 by the UE in step S2002 may be implemented by the device of FIGS. 22 to 25 described above. For example, referring to FIG. 23, one or more processors 102/202 may control one or more memories 104/204, one or more transceivers 106/206, and/or the like to receive the bandwidth for CORESET #0.

And/or, the UE (100/200 of FIGS. 22 to 25) may receive a physical downlink control channel (PDCCH) from the base station in CORESET #0 in the bandwidth in step S2003. For example, the UE may perform PDCCH monitoring or blind decoding in CORESET #0 in the bandwidth to receive PDCCH (for example, DCI).

For example, the operation of receiving the PDCCH by the UE in step S2003 may be implemented by the device of FIGS. 22 to 25 described above. For example, referring to FIG. 23, one or more processors 102/202 may control one or more memories 104/204, one or more transceivers 106/206, and/or the like to receive the PDCCH.

And/or, the UE (100/200 of FIGS. 22 to 25) may receive a PDSCH including system information (for example, SIB1 or SIB1-R) from the base station based on the PDCCH in step S2004.

For example, the PDSCH may not be received based on the fact that a slot offset K0 according to time domain resource assignment information included in the PDCCH is 0.

And/or, the UE may determine the bandwidth for the PDCCH based on the fact that the slot offset (K0) according to time domain resource assignment information (for example, a time domain resource assignment field of the DCI) included in the PDCCH is not 0. And/or, the PDSCH may be received in the bandwidth for the PDSCH. For a more specific operation/description, the proposed method of the second embodiment and/or the third embodiment described above may be referred to.

For example, the operation of transmitting the PDSCH block by the UE in step S2004 may be implemented by the device of FIGS. 22 to 25 described above. For example, referring to FIG. 23, one or more processors 102/202 may control one or more memories 104/204, one or more transceivers 106/206, and/or the like to receive the PDSCH.

Since the operation of the UE described with reference to FIG. 20 is the same as the operation of the UE described with reference to FIGS. 1 to 19 (for example, the first to third embodiments), other detailed descriptions are omitted.

The above-described signaling and operation may be implemented by a device to be described below (for example, FIGS. 22 to 25). For example, the above-described signaling and operation may be processed by one or more processors of FIGS. 22 to 25, and the above-described signaling and operation may be stored in a memory in the form of instructions/programs (for example, instructions or executable code) for driving at least one processor of FIGS. 22 to 25.

For example, a processing apparatus set to control UE so that the UE receives a physical downlink shared channel (PDSCH) in a wireless communication system may include at least one processor; and at least one memory operatively connected to the at least one processor and configured to store instructions for performing operations based on the instructions being executed by the at least one processor, wherein these operations may include receiving a synchronization signal (SS)/physical broadcast channel (PBCH) block from a base station; determining a bandwidth for CORESET #0 based on at least one of a frequency position of the SS/PBCH block and/or a frequency position of a control resource set (CORESET) #0, receiving a physical downlink control channel (PDCCH) from the base station in CORESET #0 in the bandwidth; and receiving the PDSCH including system information from the base station based on the PDCCH.

As another example, a computer-readable storage medium having at least one instruction stored therein, the instruction causing at least one processor to control operations based on the instruction being executed by the at least one processor, wherein the operations may include receiving a synchronization signal (SS)/physical broadcast channel (PBCH) block from a base station; determining a bandwidth for CORESET #0 based on at least one of a frequency position of the SS/PBCH block and/or a frequency position of a control resource set (CORESET) #0, receiving a physical downlink control channel (PDCCH) from the base station in CORESET #0 in the bandwidth; and receiving a physical downlink shared channel (PDSCH) including system information from the base station based on the PDCCH.

FIG. 21 is a flowchart illustrating a method for operating a base station proposed in the present disclosure.

Referring to FIG. 21, first, the base station (100/200 of FIGS. 22 to 25) transmits a synchronization signal (SS)/physical broadcast channel (PBCH) block to the UE in step S2101.

For example, content described with reference to FIGS. 8 to 9 in relation to the SS/PBCH block may be referred to.

For example, the UE may be a reduced capability (Red-Cap) UE. And/or, the bandwidth is smaller than the bandwidth of CORESET #0 and may be determined in units of resource blocks (RBs). For example, the UE may be UE with a reduced max UE bandwidth.

For example, the UE may report device type information to the base station before or after receiving the SS/PBCH block. For example, the report-related operation/configuration of device type information may refer to the redcap device type classification and the method for report to the base station described above.

For example, the SS/PBCH block may include information on the frequency position of CORESET #0.

For example, the operation of transmitting the SS/PBCH block by the base station in step S2101 may be implemented by the device of FIGS. 22 to 25 described above. For example, referring to FIG. 23, one or more processors 102/202 may control one or more memories 104/204, one or more transceivers 106/206, and/or the like to receive the SS/PBCH block.

And/or, the bandwidth for CORESET #0 may be determined based on at least one of a frequency position of the SS/PBCH block and/or a frequency position of a control resource set (CORESET) #0.

For example, the bandwidth may be determined as much as a maximum bandwidth of the UE (for example, the UE Rx BW/max UE bandwidth) in ascending order from the lowest resource block (RB) index of CORESET #0, as illustrated in FIG. Alternatively, the bandwidth may be determined as much as the maximum bandwidth (for example, max UE bandwidth) of the UE in descending order from the highest RB index of CORESET #0. For a more detailed operation/description, the above-described method 1-1 may be referred to.

And/or, the bandwidth may be determined as much as the maximum bandwidth of the UE (for example, the max UE bandwidth) in ascending order from the lowest resource block (RB) index of the SSB/PBCH block. Alternatively, the bandwidth may be determined as much as the maximum bandwidth of the UE (for example, the UE Rx BW/max UE bandwidth) in descending order from the highest RB index of the SSB/PBCH block, as illustrated in FIG. 16. For a more specific operation/description, the above-described method 1-2 may be referred to.

And/or, the bandwidth may be determined as much as the maximum bandwidth of the UE (for example, the UE Rx BW/max UE bandwidth) around the center frequency of CORESET #0, as illustrated in FIG. 18. For a more specific operation/description, the above-described methods 1-3 may be referred to.

And/or, the bandwidth may be determined as much as the maximum bandwidth of the UE (for example, the UE Rx BW/max UE bandwidth) around the center frequency of the SS/PBCH block, as illustrated in FIG. 17 or 19. For a more specific operation/description, the above-described methods 1-3 may be referred to.

And/or, the base station (100/200 of FIGS. 22 to 25) may transmit a physical downlink control channel (PDCCH) to the UE in CORESET #0 in the bandwidth in step S2102. For example, the UE may perform PDCCH monitoring or blind decoding in CORESET #0 in the bandwidth to receive PDCCH (for example, DCI).

For example, the operation of transmitting the PDCCH by the base station in step S2102 may be implemented by the device of FIGS. 22 to 25 described above. For example, referring to FIG. 23, one or more processors 102/202 may control one or more memories 104/204, one or more transceivers 106/206, and/or the like to receive the PDCCH.

And/or, the base station (100/200 of FIGS. 22 to 25) may receive a PDSCH including system information (for example, SIB1 or SIB1-R) from the UE based on the PDCCH in step S2103.

For example, the PDSCH may not be received based on the fact that the slot offset K0 according to time domain resource assignment information included in the PDCCH is 0.

And/or, the bandwidth for the PDCCH may be determined based on the fact that the slot offset (K0) according to time domain resource assignment information (for example, a time domain resource assignment field of the DCI) included in the PDCCH is not 0. And/or, the PDSCH may be received in the bandwidth for the PDSCH. For a more specific operation/description, the proposed method of the second embodiment and/or the third embodiment described above may be referred to.

For example, the operation of transmitting the PDSCH by the base station in step S2103 may be implemented by the device of FIGS. 22 to 25 described above. For example, referring to FIG. 23, one or more processors 102/202 may control one or more memories 104/204, one or more transceivers 106/206, and/or the like to transmit the PDSCH.

Since the operation of the base station described with reference to FIG. 21 is the same as the operation of the base station described with reference to FIGS. 1 to (for example, the first to third embodiments), other detailed descriptions are omitted.

The above-described signaling and operation may be implemented by a device to be described below (for example, FIGS. 22 to 25). For example, the above-described signaling and operation may be processed by one or more processors of FIGS. 22 to 25, and the above-described signaling and operation may be stored in a memory in the form of instructions/programs (for example, instructions or executable code) for driving at least one processor of FIGS. 22 to 25.

For example, a processing apparatus configured to control a base station so that the base station transmits a physical downlink shared channel (PDSCH) in a wireless communication system include at least one processor; and at least one memory operatively connected to the at least one processor and configured to store instructions for performing operations based on the instructions being executed by the at least one processor, wherein the operations include transmitting, to UE, a synchronization signal (SS)/physical broadcast channel (PBCH) block, a bandwidth for CORESET #0 being determined based on at least one of a frequency position of the SS/PBCH block and/or a frequency position of a control resource set (CORESET) #0; transmitting, to the UE, a physical downlink control channel (PDCCH) in CORESET #0 in the bandwidth; and transmitting, to the UE, the PDSCH including system information based on the PDCCH.

As another example, a computer-readable storage medium having at least one instruction stored therein, the instruction causing at least one processor to control operations based on the instruction being executed by the at least one processor, wherein the operations include transmitting, to UE, a synchronization signal (SS)/physical broadcast channel (PBCH) block, a bandwidth for control resource set (CORESET) #0 being determined based on at least one of a frequency position of the SS/PBCH block and/or a frequency position of a control resource set (CORESET) #0; transmitting, to the UE, a physical downlink control channel (PDCCH) in CORESET #0 in the bandwidth; and transmitting, to the UE, the physical downlink shared channel (PDSCH) including system information based on the PDCCH.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 22 illustrates a communication system (1) applied to the disclosure.

Referring to FIG. 22, a communication system applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 23 illustrates wireless devices applicable to the disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s)

202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of a Wireless Device Applied to the Disclosure

FIG. 24 illustrates another example of a wireless device applied to the disclosure. The wireless device may be implemented in various forms according to a use-case/service.

Referring to FIG. 24, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 23. For example, the transceiver(s) 114 may include the one or more transceivers 106 and 106 and/or the one or more antennas 108 and 108 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

FIG. 25 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 25, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 24, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140a may supply power to the portable device 1010 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

In this case, a wireless communication technology implemented in the wireless device 100, 200 of the present disclosure may include Narrowband Internet of Things for low energy communication in addition to LTE, NR and 6G. In this case, for example, the NB-IoT technology may be an example of a Low Power Wide Area Network (LPWAN) technology, and may be implemented by standards, such as LTE Cat NB1 and/or LTE Cat NB2, and the present disclosure is not limited to the aforementioned names. Additionally or alternatively, a wireless communication technology implemented in a wireless device (100, 200) of the present disclosure may perform communication based on the LTE-M technology. In this case, for example, the LTE-M technology may be an example of the LPWAN technology and may be called various names, such as enhanced Machine Type Communication (eMTC). For example, the LTE-M technology may be implemented by at least any one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and the present disclosure is not limited to the aforementioned names.

Additionally or alternatively, a wireless communication technology implemented in a wireless device (100, 200) of the present disclosure may include at least any one of ZigBee, Bluetooth and a Low Power Wide Area Network (LPWAN) in which low energy communication is considered, and the present disclosure is not limited to the aforementioned names. For example, the ZigBee technology may generate a personal area networks (PAN) related to small/low-power digital communication based on various standards, such as IEEE 802.15.4, and may be called various names.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed. Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving PDSCH in the wireless communication system of the present disclosure has been described in connection with examples in which it applies to 3GPP LTE/LTE-A system and 5G systems (new RAT systems), the method is also applicable to other various wireless communication systems such as Beyond 5G, 6G, and Beyond 6G.

The invention claimed is:

1. A method of receiving a physical downlink shared channel (PDSCH) in a wireless communication system, the method performed by a user equipment (UE) comprising:
   receiving, from a base station (BS), a synchronization signal (SS)/physical broadcast channel (PBCH) block;
   determining a bandwidth for CORESET #0 based on at least one of a frequency position of the SS/PBCH block and/or a frequency position of a control resource set (CORESET) #0;
   receiving, from the BS, a physical downlink control channel (PDCCH) in CORESET #0 in the bandwidth; and
   receiving, from the BS, the PDSCH including system information based on the PDCCH,
   wherein the bandwidth is determined as a maximum bandwidth of the UE in ascending order from a lowest resource block (RB) index of CORESET #0, or is determined as the maximum bandwidth of the UE in descending order from a highest RB index of CORESET #0.

2. The method of claim 1, wherein the UE is reduced capability (RedCap) UE.

3. The method of claim 2, wherein the bandwidth is smaller than the bandwidth of CORESET #0 and is determined in units of resource blocks (RBs).

4. The method of claim 1, wherein the PDSCH is not received based on a slot offset (K0) according to time domain resource assignment information included in the PDCCH being 0.

5. The method of claim 1, further comprising determining a bandwidth for the PDSCH based on a slot offset (K0) according to time domain resource assignment information included in the PDCCH being not 0.

6. The method of claim 5, wherein the PDSCH is received in the bandwidth for the PDSCH.

7. The method of claim 1, wherein the SS/PBCH block includes information on the frequency position of CORESET #0.

8. A user equipment (UE) configured to receive a physical downlink shared channel (PDSCH) in a wireless communication system, the UE comprising:
   at least one transceiver;
   at least one processor; and
   at least one memory operatively connected to the at least one processor and configured to store instructions for performing operations based on the instructions being executed by the at least one processor,
   wherein these operations include:
   receiving, from a base station (BS), a synchronization signal (SS)/physical broadcast channel (PBCH) block;
   determining a bandwidth for CORESET #0 based on at least one of a frequency position of the SS/PBCH block and/or a frequency position of a control resource set (CORESET) #0;
   receiving, from the BS, a physical downlink control channel (PDCCH) in CORESET #0 in the bandwidth; and
   receiving, from the BS, the PDSCH including system information based on the PDCCH,
   wherein the bandwidth is determined as a maximum bandwidth of the UE in ascending order from a lowest resource block (RB) index of CORESET #0, or is determined as the maximum bandwidth of the UE in descending order from a highest RB index of CORESET #0.

9. The UE of claim 8, wherein the UE is reduced capability (RedCap) UE.

10. The UE of claim 9, wherein the bandwidth is smaller than the bandwidth of CORESET #0 and is determined in units of resource blocks (RBs).

11. A method of transmitting a physical downlink shared channel (PDSCH) in a wireless communication system, the method performed by a base station (BS) comprising:

transmitting, to a user equipment (UE), a synchronization signal (SS)/physical broadcast channel (PBCH) block, a bandwidth for control resource set (CORESET) #0 being determined based on at least one of a frequency position of the SS/PBCH block and/or a frequency position of CORESET #0;

transmitting, to the UE, a physical downlink control channel (PDCCH) in CORESET #0 in the bandwidth; and transmitting, to the UE, the PDSCH including system information based on the PDCCH, wherein the bandwidth is determined as a maximum bandwidth of the UE in ascending order from a lowest resource block (RB) index of CORESET #0, or is determined as the maximum bandwidth of the UE in descending order from a highest RB index of CORESET #0.

*  *  *  *  *